US010296817B1

(12) United States Patent
Yang et al.

(10) Patent No.: US 10,296,817 B1
(45) Date of Patent: May 21, 2019

(54) APPARATUS FOR RECOGNITION OF HANDWRITTEN CHINESE CHARACTERS

(71) Applicant: GYRFALCON TECHNOLOGY INC., Milpitas, CA (US)

(72) Inventors: Lin Yang, Milpitas, CA (US); Patrick Z. Dong, San Jose, CA (US); Charles Jin Young, Milpitas, CA (US); Jason Dong, San Jose, CA (US); Wenhan Zhang, Mississauga (CA); Baohua Sun, Fremont, CA (US)

(73) Assignee: Gyrfalcon Technology Inc., Milpitas, CA (US)

( * ) Notice: Subject to any disclaimer, the term of this patent is extended or adjusted under 35 U.S.C. 154(b) by 0 days.

(21) Appl. No.: 15/941,514

(22) Filed: Mar. 30, 2018

(51) Int. Cl.
*G06K 9/00* (2006.01)
*G06K 9/68* (2006.01)
(Continued)

(52) U.S. Cl.
CPC ....... *G06K 9/6821* (2013.01); *G06F 13/4282* (2013.01); *G06F 17/2863* (2013.01);
(Continued)

(58) Field of Classification Search
CPC .... G06K 9/66; G06K 2209/01; G06K 9/4628; G06K 9/00986; G06K 9/6267;
(Continued)

(56) References Cited

U.S. PATENT DOCUMENTS

| | | | | |
|---|---|---|---|---|
| 5,140,670 A | * | 8/1992 | Chua | G06N 3/0635 706/29 |
| 5,835,633 A | * | 11/1998 | Fujisaki | G06K 9/6292 382/187 |

(Continued)

OTHER PUBLICATIONS

Chua, Leon O., and Lin Yang. "Cellular neural networks: Applications." IEEE Transactions on circuits and systems 35.10 (1988): 1273-1290.*

(Continued)

*Primary Examiner* — Li Liu
(74) *Attorney, Agent, or Firm* — RC Patent Services

(57) ABSTRACT

Apparatus for recognition of handwritten Chinese characters contains a bus, an input means connecting to the bus for receiving input imagery data created from a handwritten Chinese character, a Cellular Neural Networks or Cellular Nonlinear Networks (CNN) based integrated circuit operatively connecting to the bus for extracting features out of the input imagery data using pre-trained filter coefficients of a plurality of order convolutional layers stored therein, a memory connecting the bus, the memory being configured for storing weight coefficients of fully-connected (FC) layers, a processing unit connecting to the bus for performing computations of FC layers to classify the extracted features from the CNN based integrated circuit to a particular Chinese character in a predefined Chinese character set, and a display unit connecting to the bus for displaying the particular Chinese character. Greater than 95% recognition accuracy is achieved using multiple bi-valued 3×3 filter kernels as pre-trained filter coefficients.

16 Claims, 34 Drawing Sheets

(51) Int. Cl.
*G06K 9/62* (2006.01)
*G06F 13/42* (2006.01)
*G06N 3/02* (2006.01)
*G06F 17/28* (2006.01)

(52) U.S. Cl.
CPC .............. *G06K 9/627* (2013.01); *G06N 3/02* (2013.01); *G06K 2209/011* (2013.01)

(58) Field of Classification Search
CPC ......... G06K 9/00268; G06K 2209/011; G06K 9/00067; G06K 9/00979; G06K 9/4604
See application file for complete search history.

(56) References Cited

U.S. PATENT DOCUMENTS

| | | | | |
|---|---|---|---|---|
| 8,391,602 | B2* | 3/2013 | Chaki | G06K 9/34 382/173 |
| 9,990,564 | B2* | 6/2018 | Singh | G06K 9/6254 |
| 2004/0008883 | A1* | 1/2004 | Shi | G06K 9/00986 382/158 |
| 2004/0037464 | A1* | 2/2004 | Shi | G06K 9/00986 382/190 |
| 2018/0137350 | A1* | 5/2018 | Such | G06K 9/00463 |

OTHER PUBLICATIONS

L. O. Chua, L. Yang, "Cellular neural networks: Theory", IEEE Trans. Circuits Syst. 35.10 (1988), pp. 1257-1272.*
Tavsanoglu, Vedat, and Ertugrul Saatci. "Feature extraction for character recognition using Gabor-type filters implemented by cellular neural networks." Cellular Neural Networks and their Applications (CNNA 2000) (2000): 63.*
Shur et al. "A Corpus of Natural Language for Visual Reasoning", 2017, Facebook AI Research, Menlo Park, CA.
Yoon Kim, "Convolutional Neural Networks for Sentence Classification", Sep. 2014, New York University.
Rastegari et al. "XNOR-Net: ImageNet Classification Using Binary Convolutional Neural Networks", Aug. 2, 2016, Allen Institute for AI, Univ. of Washington.
Gysel et al. "Hardware-Oriented Approximation of Convolutional Neural Networks", Oct. 20, 2016, Department of Electrical and Computer Engineering, University of California, Davis, CA.
Cheng et al. "Handwritten Chinese Character Recognition by Joint Classification and Similarity Ranking", Chongqing Institute of Green and Intelligent Technology, Chinese Academy of Sciences, Institute of Automation, Chinese Academy of Sciences 2167-6445/16 2016 IEEE DOI 10.1109/ICFHR.2016.92.
Yin et al. "ICDAR 2013 Chinese Handwriting Recognition Competition", National Laboratory of Pattern Recognition (NLPR) Institute of Automation of Chinese Academy of Sciences, 2013.

* cited by examiner

APPARATUS FOR RECOGNITION OF HANDWRITTEN CHINESE CHARACTERS

FIELD

The invention generally relates to the field of machine learning and more particularly to apparatus for handwritten Chinese characters with a Cellular Neural Networks or Cellular Nonlinear Networks (CNN) based Integrated Circuit embedded therein.

BACKGROUND

An ideogram is a graphic symbol that represents an idea or concept. Some ideograms are comprehensible only by familiarity with prior convention; others convey their meaning through pictorial resemblance to a physical object.

Chinese characters are ideograms primarily used in the writing of Chinese. Learning to read handwritten Chinese takes practice, even if a student of Chinese already knows the characters. There are two main reasons:
1. Most people's handwriting is not anywhere near as neat as printed letters or standard computer fonts. Writing clearly takes practice and time; most people simply can't be bothered. The result is either sloppy, cursive or both. This is faster to write, but harder to read.
2. People write characters differently, so even if the student has learnt how one person writes, it's not a given that the student also understands what someone else writes.

Machine learning is an application of artificial intelligence. In machine learning, a computer or computing device is programmed to think like human beings so that the computer may be taught to learn on its own. The development of neural networks has been key to teaching computers to think and understand the world in the way human beings do. Many deep learning networks such as Cellular Neural Networks or Cellular Nonlinear Networks (CNN) have been developed in the past decade. However leaning handwritten Chinese characters are still a challenge. Many prior approaches require a relatively large computer system using filter coefficients based on floating point numbers.

According, it would be desired to have an improved method and system for optical recognition of handwritten Chinese characters using a CNN based integrated circuit.

SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

Apparatus for recognition of handwritten Chinese characters are disclosed. According to one aspect, handwritten Chinese character recognition apparatus contains a bus, an input unit, a Cellular Neural Networks or Cellular Nonlinear Networks (CNN) based integrated circuit, a memory, a processing unit and a display unit. The input unit connects to the bus for receiving input imagery data created from a handwritten Chinese character. CNN based integrated circuit operatively connects to the bus for extracting features out of the input imagery data using pre-trained filter coefficients of a plurality of order convolutional layers stored therein. The memory, connecting the bus, is configured for storing weight coefficients of fully-connected (FC) layers. Processing unit connecting to the bus for performing computations of FC layers to classify the extracted features from the CNN based integrated circuit to a particular Chinese character in a predefined Chinese character set. Display unit connecting to the bus for displaying the particular Chinese character.

According to another aspect of the disclosure, a digital integrated circuit contains cellular neural networks (CNN) processing engines operatively coupled to at least one input/output data bus. The CNN processing engines are connected in a loop with a clock-skew circuit. Each CNN processing engine includes a CNN processing block configured for simultaneously performing convolutional operations using input imagery data and pre-trained filter coefficients of a plurality of ordered convolutional layers. The first set of memory buffers operatively couples to the CNN processing block for storing the input imagery data. The second set of memory buffers operative couples to the CNN processing block for storing the pre-trained filter coefficients.

Objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

DETAILED DESCRIPTIONS

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Used herein, the terms "vertical", "horizontal", "diagonal", "left", "right", "top", "bottom", "column", "row", "diagonally" are intended to provide relative positions for the purposes of description, and are not intended to designate an absolute frame of reference. Additionally, used herein, term "character" and "script" are used interchangeably.

Embodiments of the invention are discussed herein with reference to FIGS. 1-22. However, those skilled in the art will readily appreciate that the detailed description given herein with respect to these figures is for explanatory purposes as the invention extends beyond these limited embodiments.

Figure 1:
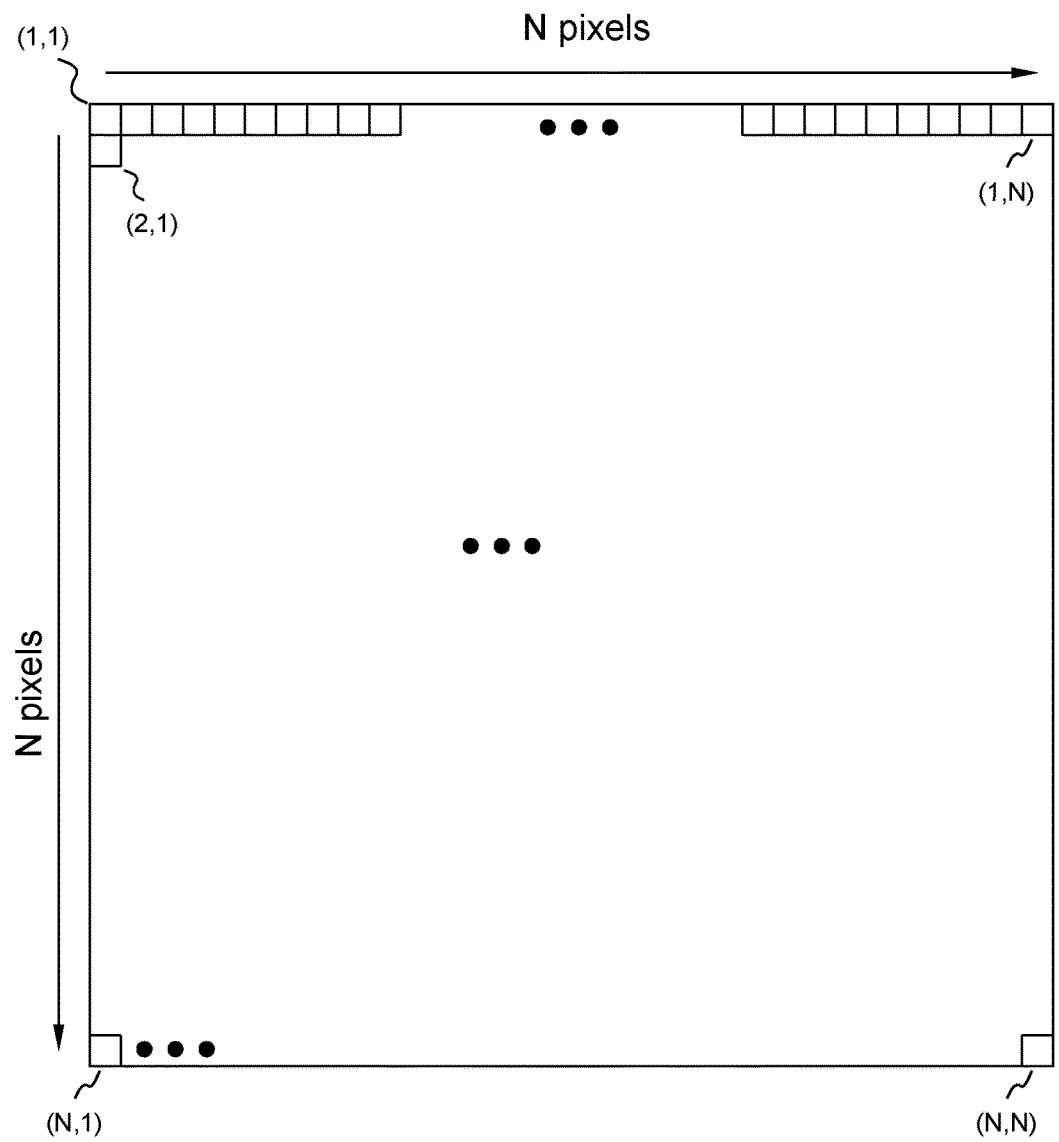
FIG. 1 is a diagram illustrating an example two-dimensional symbol comprising a matrix of N×N pixels of data that represents a "super-character" for facilitating machine learning of a combined meaning of multiple ideograms contained therein according to an embodiment of the invention.

Referring first to FIG. 1, it is shown a diagram showing an example two-dimensional symbol 100 for facilitating machine learning of a combined meaning of multiple ideograms contained therein. The two-dimensional symbol 100 comprises a matrix of N×N pixels (i.e., N columns by N rows) of data containing a "super-character". Pixels are ordered with row first and column second as follows: (1,1), (1,2), (1,3), ... (1,N), (2,1), ..., (N,1), (N,N). N is a positive integer, for example in one embodiment, N is equal to 224.

"Super-character" represents at least one meaning each formed with a specific combination of a plurality of ideograms. Since an ideogram can be represented in a certain size matrix of pixels, two-dimensional symbol 100 is divided into M×M sub-matrices. Each of the sub-matrices represents one ideogram, which is defined in an ideogram collection set by humans. "Super-character" contains a minimum of two and a maximum of M×M ideograms. Both N and M are positive integers, and N is preferably a multiple of M.

Figure 2A:
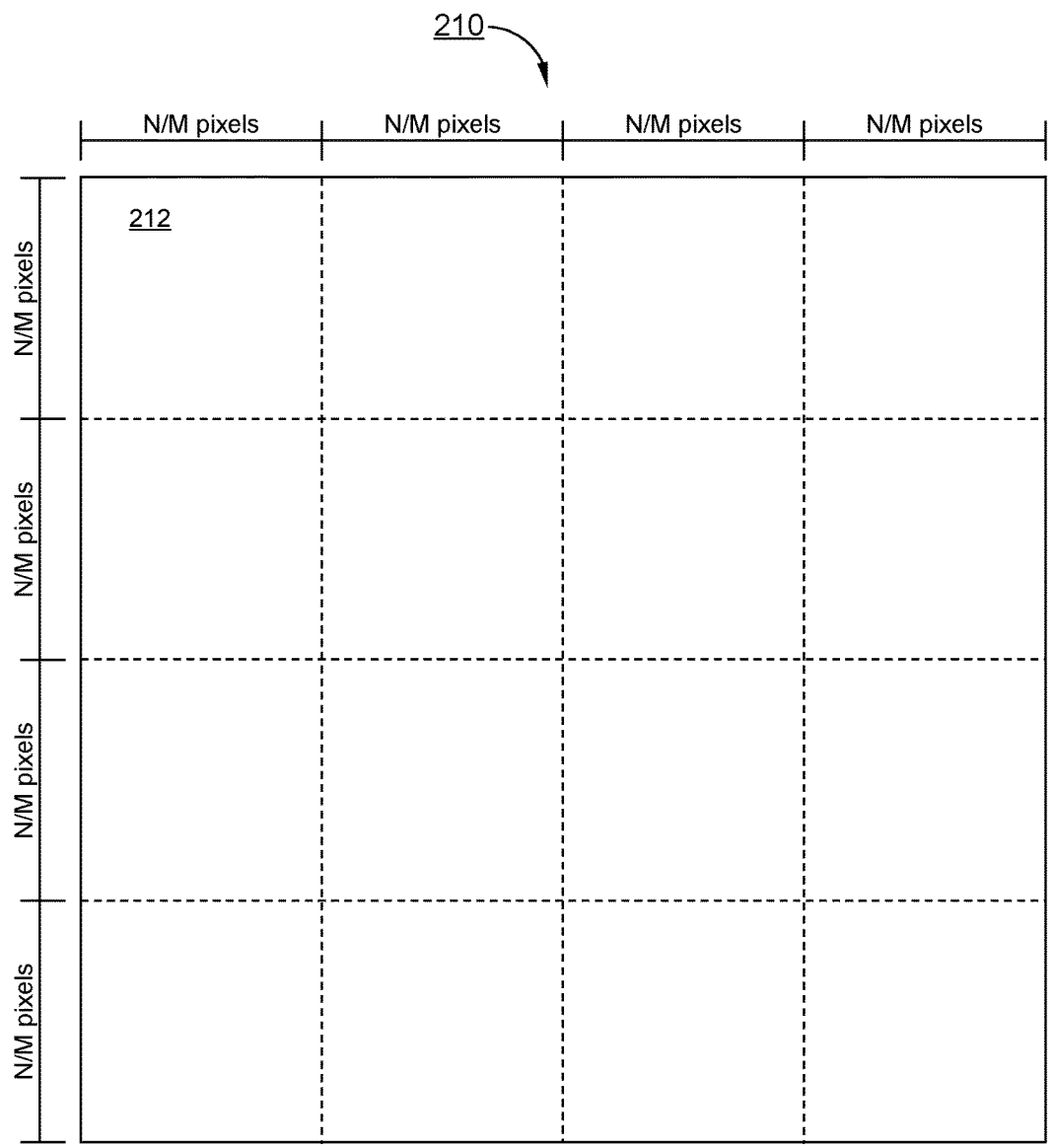
FIGS. 2A-2B are diagrams showing example partition schemes for dividing the two-dimensional symbol of FIG. 1 in accordance with embodiments of the invention.

Shown in FIG. 2A, it is a first example partition scheme 210 of dividing a two-dimension symbol into M×M sub-matrices 212. M is equal to 4 in the first example partition scheme. Each of the M×M sub-matrices 212 contains (N/M)×(N/M) pixels. When N is equal to 224, each sub-matrix contains 56×56 pixels and there are 16 sub-matrices.

Figure 2B:
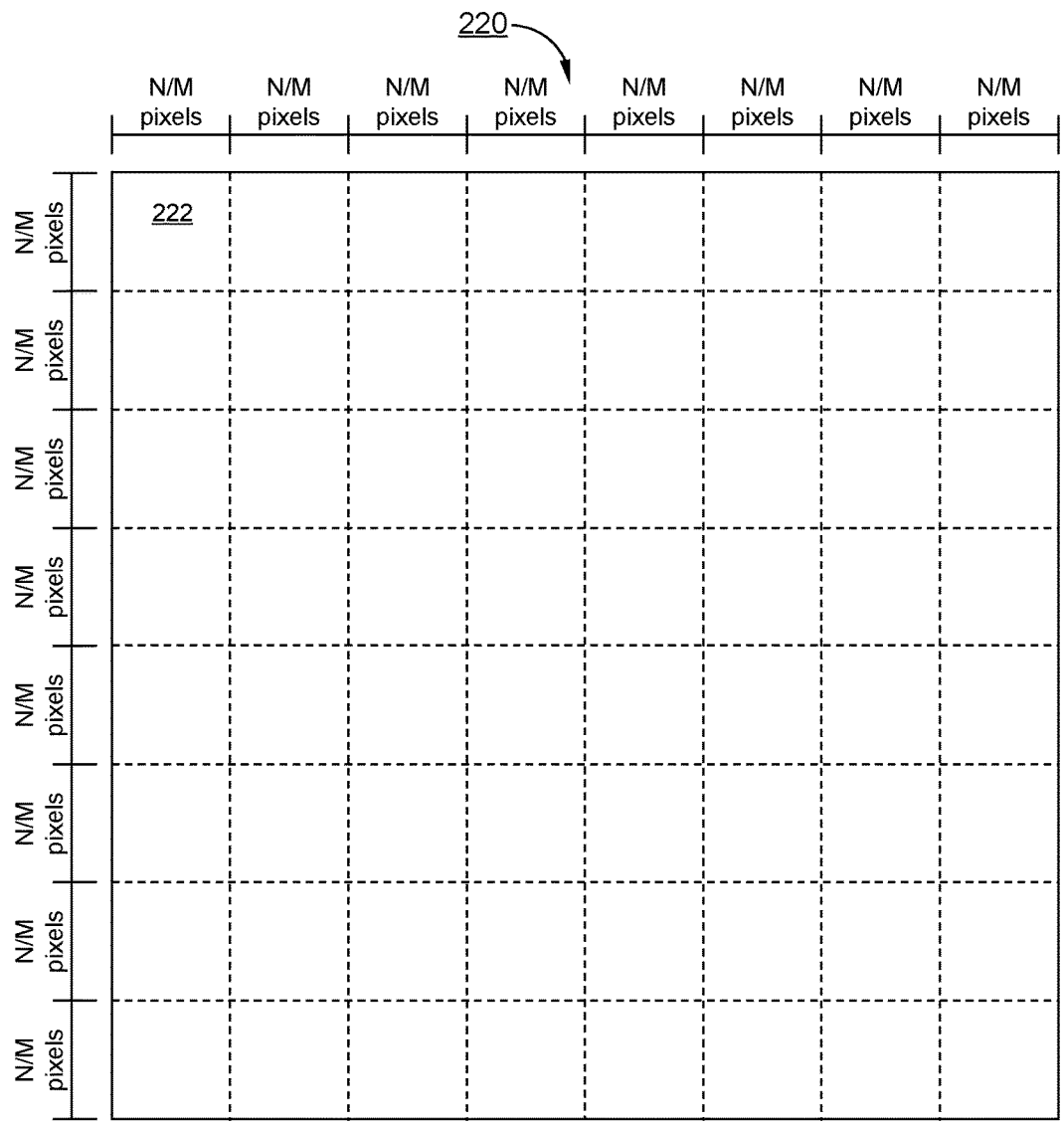

A second example partition scheme 220 of dividing a two-dimension symbol into M×M sub-matrices 222 is shown in FIG. 2B. M is equal to 8 in the second example partition scheme. Each of the M×M sub-matrices 222 contains (N/M)×(N/M) pixels. When N is equal to 224, each sub-matrix contains 28×28 pixels and there are 64 sub-matrices.

Figure 3A:
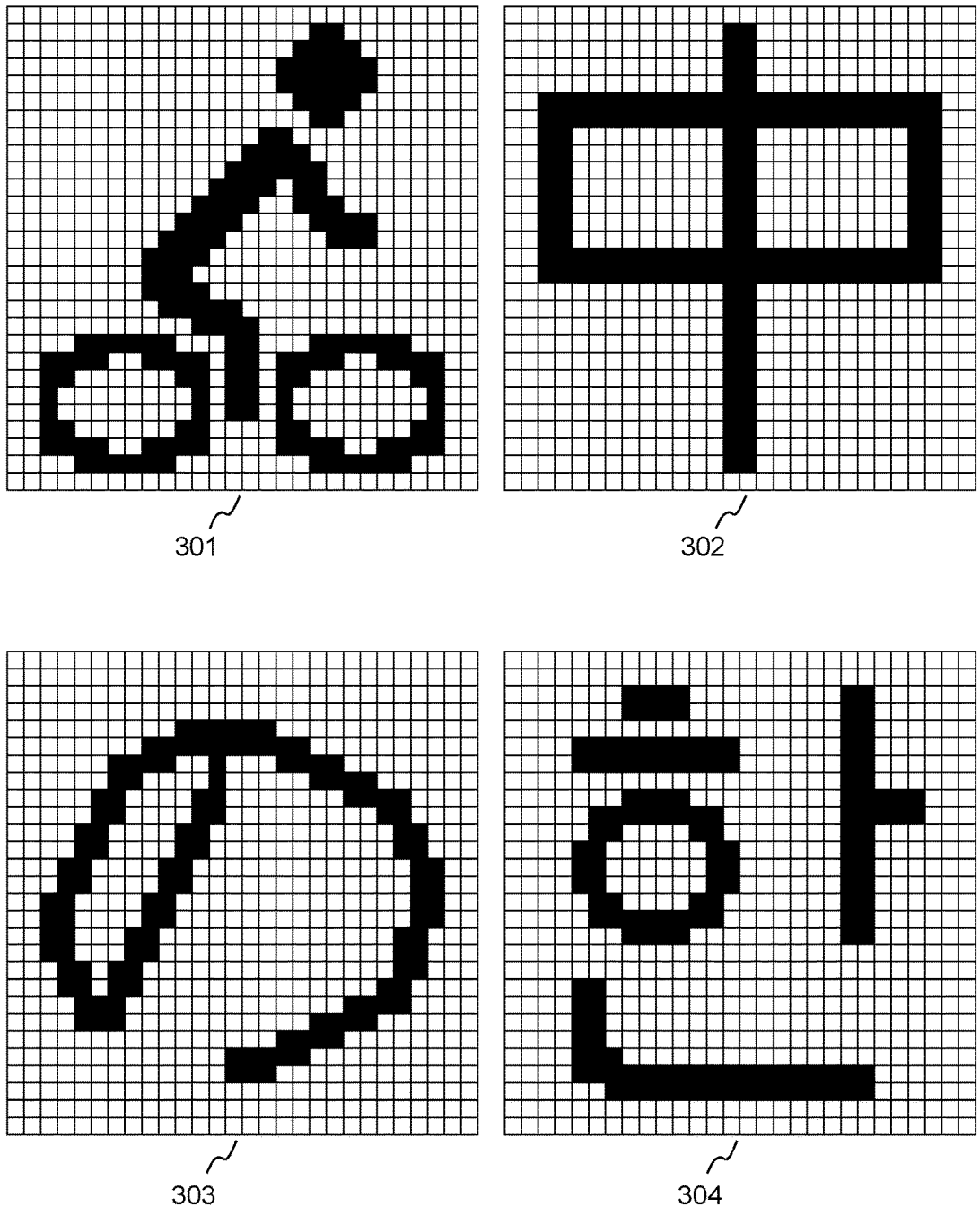
FIGS. 3A-3B show example ideograms in accordance with an embodiment of the invention.

FIG. 3A shows example ideograms 301-304 that can be represented in a sub-matrix 222 (i.e., 28×28 pixels). For those having ordinary skill in the art would understand that the sub-matrix 212 having 56×56 pixels can also be adapted for representing these ideograms. The first example ideogram 301 is a pictogram representing an icon of a person riding a bicycle. The second example ideogram 302 is a logosyllabic script or character representing an example Chinese character. The third example ideogram 303 is a logosyllabic script or character representing an example Japanese character and the fourth example ideogram 304 is a logosyllabic script or character representing an example Korean character. Additionally, ideogram can also be punctuation marks, numerals or special characters. In another embodiment, pictogram may contain an icon of other images. Icon used herein in this document is defined by humans as a sign or representation that stands for its object by virtue of a resemblance or analogy to it.

Figure 3B:
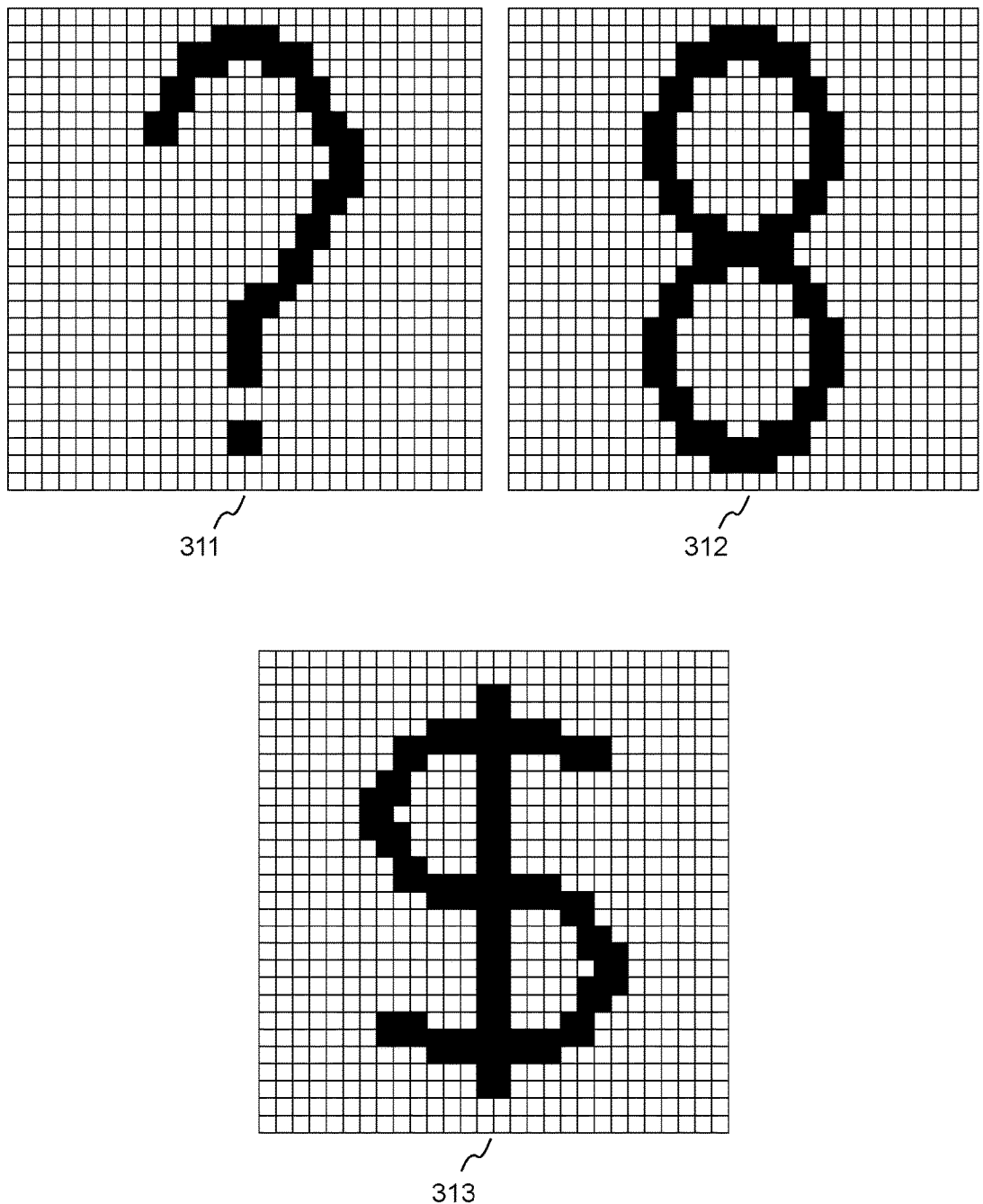
Figure 3C:
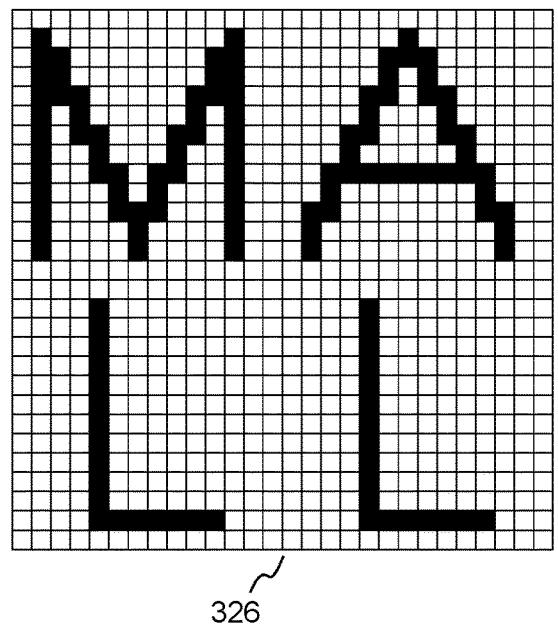
FIG. 3C shows example pictograms containing western languages based on Latin letters in accordance with an embodiment of the invention.
Figure 3C:
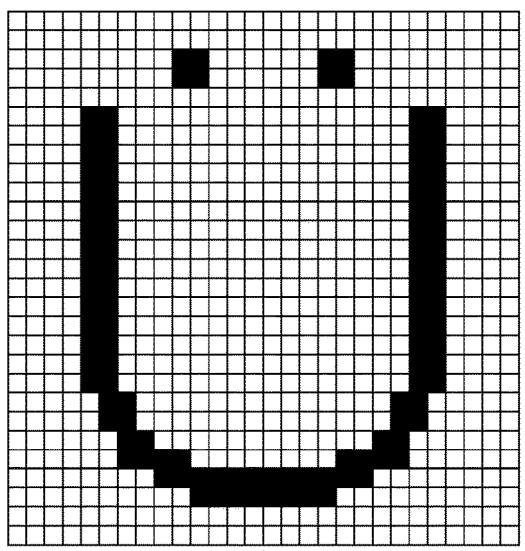
Figure 3C:
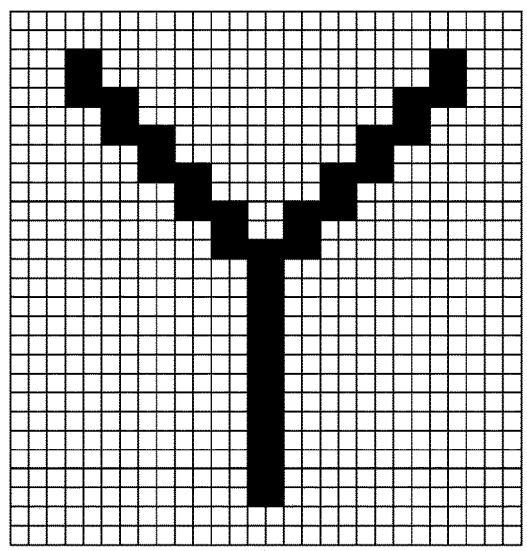

FIG. 3B shows several example ideograms representing: a punctuation mark 311, a numeral 312 and a special character 313. Furthermore, pictogram may contain one or more words of western languages based on Latin letters, for example, English, Spanish, French, German, etc. FIG. 3C shows example pictograms containing western languages based on Latin letters. The first example pictogram 326 shows an English word "MALL". The second example pictogram 327 shows a Latin letter "U" and the third example pictogram 328 shows English alphabet "Y". Ideogram can be any one of them, as long as the ideogram is defined in the ideogram collection set by humans.

Only limited number of features of an ideogram can be represented using one single two-dimensional symbol. For example, features of an ideogram can be black and white when data of each pixel contains one-bit. Feature such as grayscale shades can be shown with data in each pixel containing more than one-bit.

Additional features are represented using two or more layers of an ideogram. In one embodiment, three respective basic color layers of an ideogram (i.e., red, green and blue) are used collectively for representing different colors in the ideogram. Data in each pixel of the two-dimensional symbol contains a K-bit binary number. K is a positive integer. In one embodiment, K is 5.

Figure 3D:
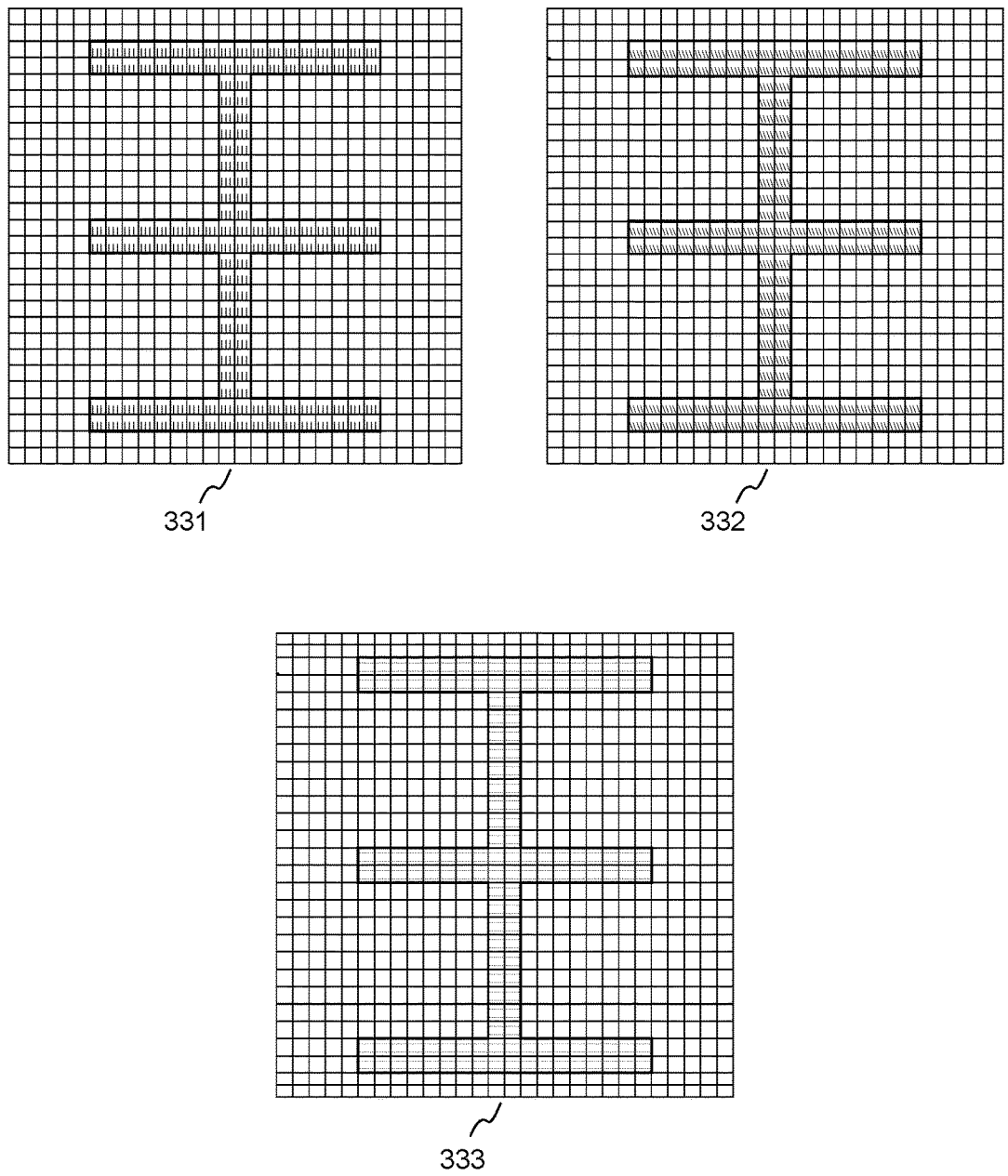
FIG. 3D shows three respective basic color layers of an example ideogram in accordance with an embodiment of the invention.

FIG. 3D shows three respective basic color layers of an example ideogram. Ideogram of a Chinese character are shown with red 331, green 332 and blue 333. With different combined intensity of the three basic colors, a number of color shades can be represented. Multiple color shades may exist within an ideogram.

Figure 3E:
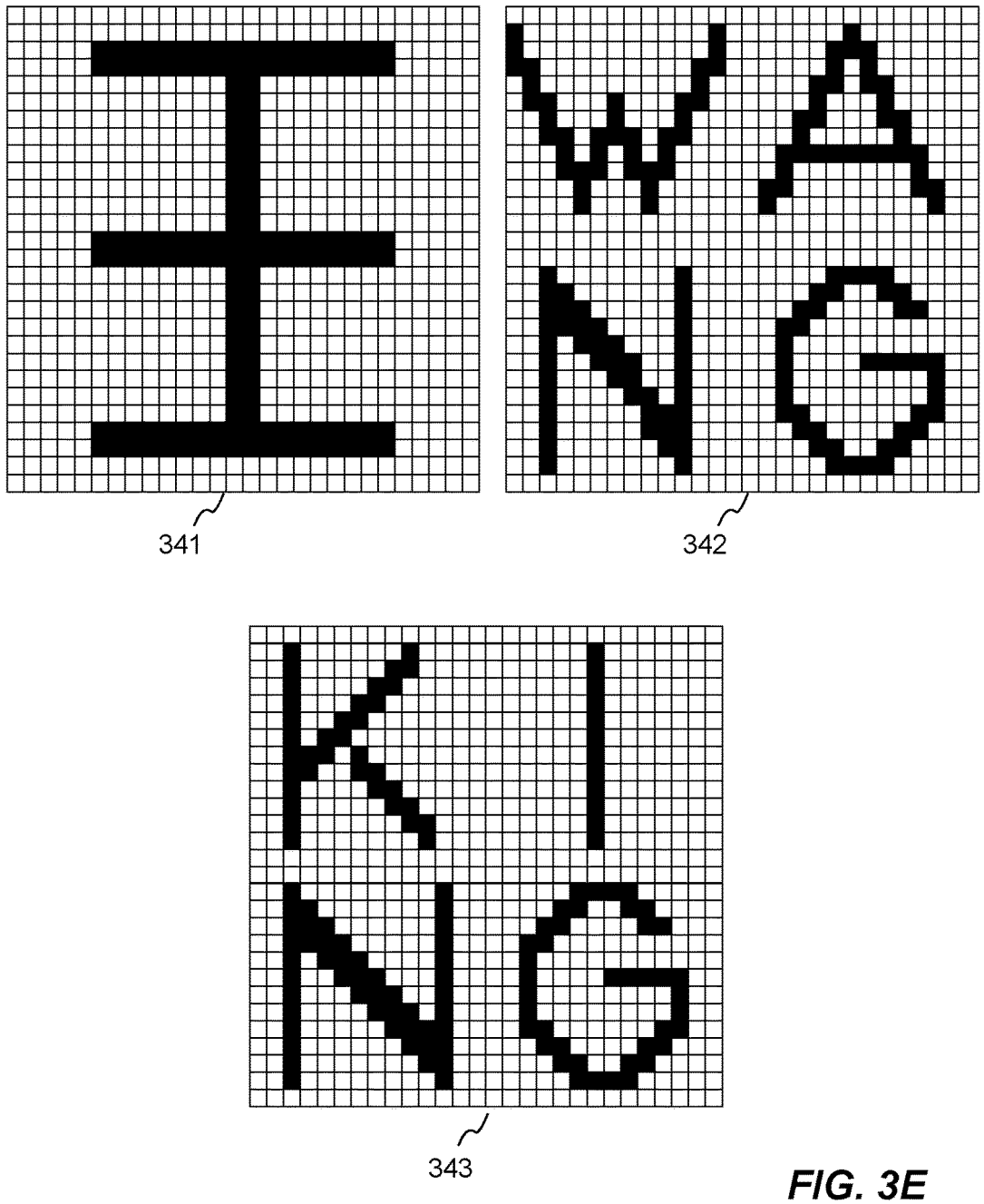
FIG. 3E shows three related layers of an example ideogram for dictionary-like definition in accordance with an embodiment of the invention.

In another embodiment, three related ideograms are used for representing other features such as a dictionary-like definition of a Chinese character shown in FIG. 3E. There are three layers for the example ideogram in FIG. 3E: the first layer 341 showing a Chinese logosyllabic character, the second layer 342 showing the Chinese "pinyin" pronunciation as "wang", and the third layer 343 showing the meaning in English as "king".

Ideogram collection set includes, but is not limited to, pictograms, icons, logos, logosyllabic characters, punctuation marks, numerals, special characters. Logosyllabic characters may contain one or more of Chinese characters, Japanese characters, Korean characters, etc.

In order to systematically include Chinese characters, a standard Chinese character set (e.g., GB18030) may be used as a start for the ideogram collection set. For including Japanese and Korean characters, CJK Unified Ideographs may be used. Other character sets for logosyllabic characters or scripts may also be used.

A specific combined meaning of ideograms contained in a "super-character" is a result of using image processing techniques in a Cellular Neural Networks or Cellular Non-linear Networks (CNN) based computing system. Image processing techniques include, but are not limited to, convolutional neural networks, recurrent neural networks, etc.

"Super-character" represents a combined meaning of at least two ideograms out of a maximum of M×M ideograms. In one embodiment, a pictogram and a Chinese character are combined to form a specific meaning. In another embodiment, two or more Chinese characters are combined to form a meaning. In yet another embodiment, one Chinese character and a Korean character are combined to form a meaning. There is no restriction as to which two or more ideograms to be combined.

Ideograms contained in a two-dimensional symbol for forming "super-character" can be arbitrarily located. No specific order within the two-dimensional symbol is required. Ideograms can be arranged left to right, right to left, top to bottom, bottom to top, or diagonally.

Using written Chinese language as an example, combining two or more Chinese characters may result in a "super-character" including, but not limited to, phrases, idioms, proverbs, poems, sentences, paragraphs, written passages, articles (i.e., written works). In certain instances, the "super-character" may be in a particular area of the written Chinese language. The particular area may include, but is not limited to, certain folk stories, historic periods, specific background, etc.

Figure 4A:
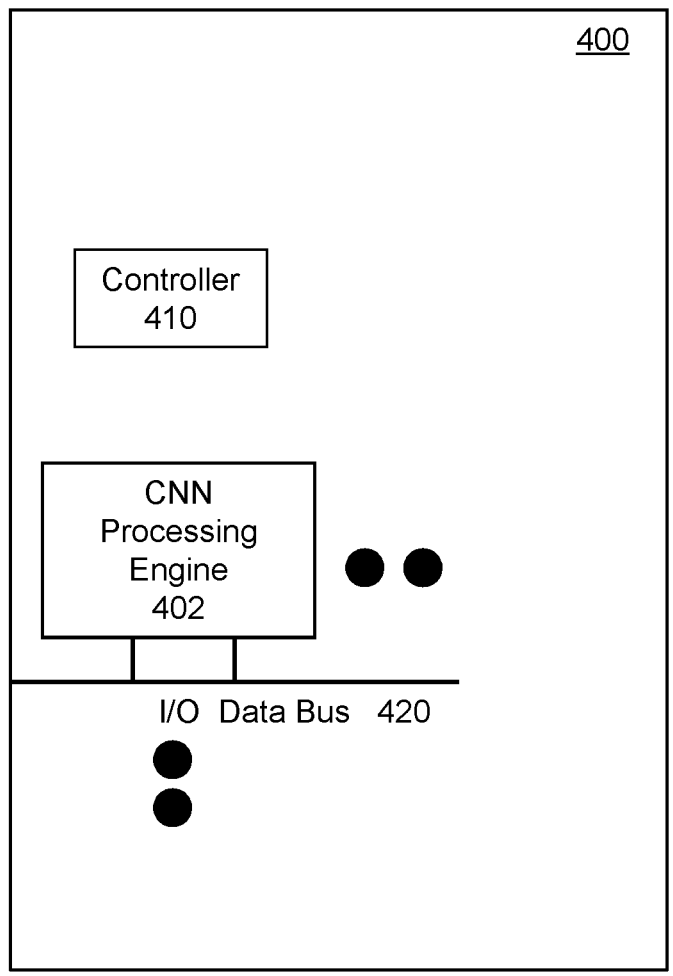
FIG. 4A is a block diagram illustrating an example Cellular Neural Networks or Cellular Nonlinear Networks (CNN) based computing system for machine learning of a combined meaning of multiple ideograms contained in a two-dimensional symbol, according to one embodiment of the invention.

Referring now to FIG. 4A, it is shown a block diagram illustrating an example CNN based computing system 400 configured for machine learning of a combined meaning of multiple ideograms contained in a two-dimensional symbol (e.g., the two-dimensional symbol 100).

The CNN based computing system 400 may be implemented on integrated circuits as a digital semi-conductor chip (e.g., a silicon substrate) and contains a controller 410, and a plurality of CNN processing units 402a-402b operatively coupled to at least one input/output (I/O) data bus 420. Controller 410 is configured to control various operations of the CNN processing units 402a-402b, which are connected in a loop with a clock-skew circuit.

In one embodiment, each of the CNN processing units 402a-402b is configured for processing imagery data, for example, two-dimensional symbol 100 of FIG. 1.

To store an ideogram collection set, one or more storage units operatively coupled to the CNN based computing system 400 are required. Storage units (not shown) can be located either inside or outside the CNN based computing system 400 based on well known techniques.

"Super-character" may contain more than one meanings in certain instances. "Super-character" can tolerate certain errors that can be corrected with error-correction techniques. In other words, the pixels represent ideograms do not have to be exact. The errors may have different causes, for example, data corruptions, during data retrieval, etc.

Figure 4B:
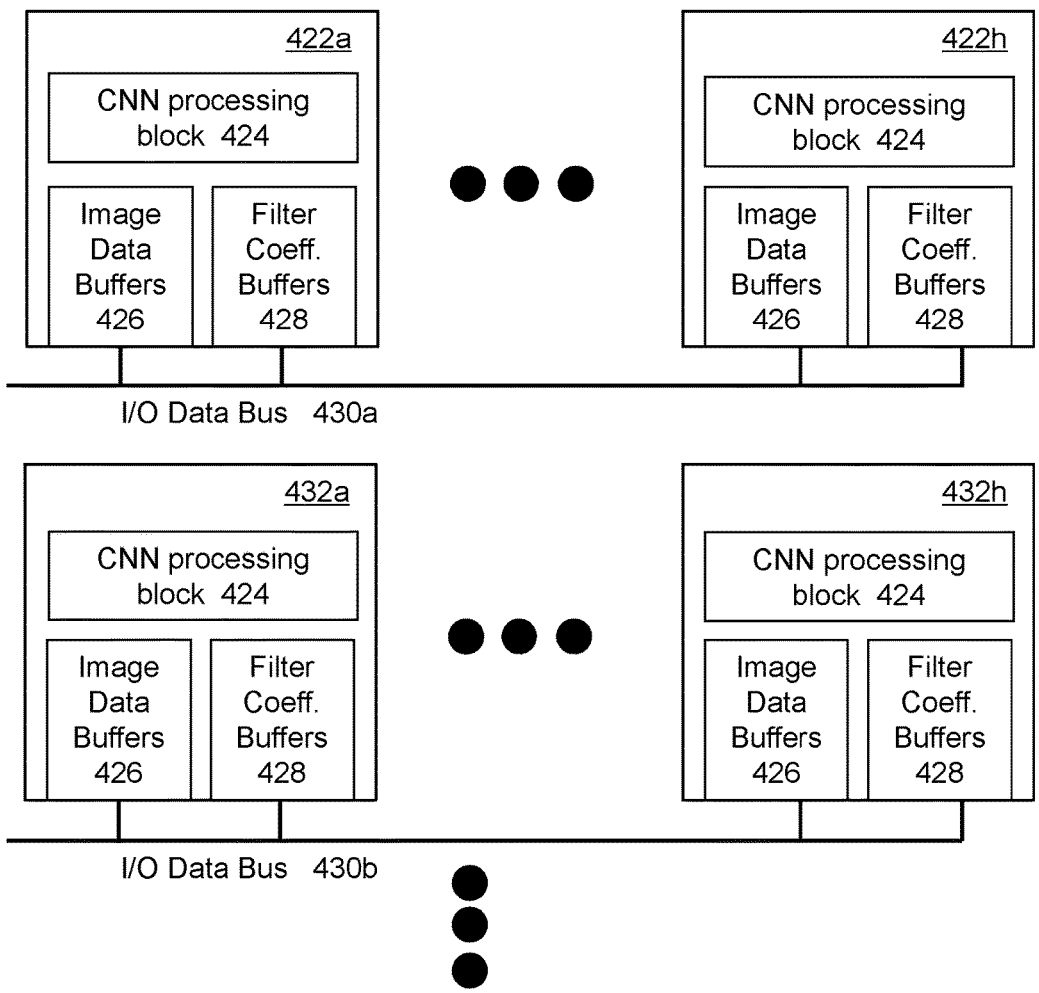
FIG. 4B is a block diagram illustrating an example CNN based integrated circuit for performing image processing based on convolutional neural networks, according to one embodiment of the invention.

In another embodiment, the CNN based computing system is a digital integrated circuit that can be extendable and scalable. For example, multiple copies of the digital integrated circuit may be implemented on a single semi-conductor chip as shown in FIG. 4B.

All of the CNN processing engines are identical. For illustration simplicity, only few (i.e., CNN processing engines 422a-422h, 432a-432h) are shown in FIG. 4B. The invention sets no limit to the number of CNN processing engines on a digital semi-conductor chip.

Each CNN processing engine 422a-422h, 432a-432h contains a CNN processing block 424, a first set of memory buffers 426 and a second set of memory buffers 428. The first set of memory buffers 426 is configured for receiving imagery data and for supplying the already received imagery data to the CNN processing block 424. The second set of memory buffers 428 is configured for storing filter coefficients and for supplying the already received filter coefficients to the CNN processing block 424. In general, the number of CNN processing engines on a chip is $2^n$, where n is an integer (i.e., 0, 1, 2, 3, . . . ). As shown in FIG. 4B, CNN processing engines 422a-422h are operatively coupled to a first input/output data bus 430a while CNN processing engines 432a-432h are operatively coupled to a second input/output data bus 430b. Each input/output data bus 430a-430b is configured for independently transmitting data (i.e., imagery data and filter coefficients). In one embodiment, the first and the second sets of memory buffers comprise random access memory (RAM), which can be a combination of one or more types, for example, Magnetic Random Access Memory, Static Random Access Memory, etc. Each of the first and the second sets are logically defined. In other words, respective sizes of the first and the second sets can be reconfigured to accommodate respective amounts of imagery data and filter coefficients.

The first and the second I/O data bus 430a-430b are shown here to connect the CNN processing engines 422a-422h, 432a-432h in a sequential scheme. In another embodiment, the at least one I/O data bus may have different connection scheme to the CNN processing engines to accomplish the same purpose of parallel data input and output for improving performance.

Figure 5A:
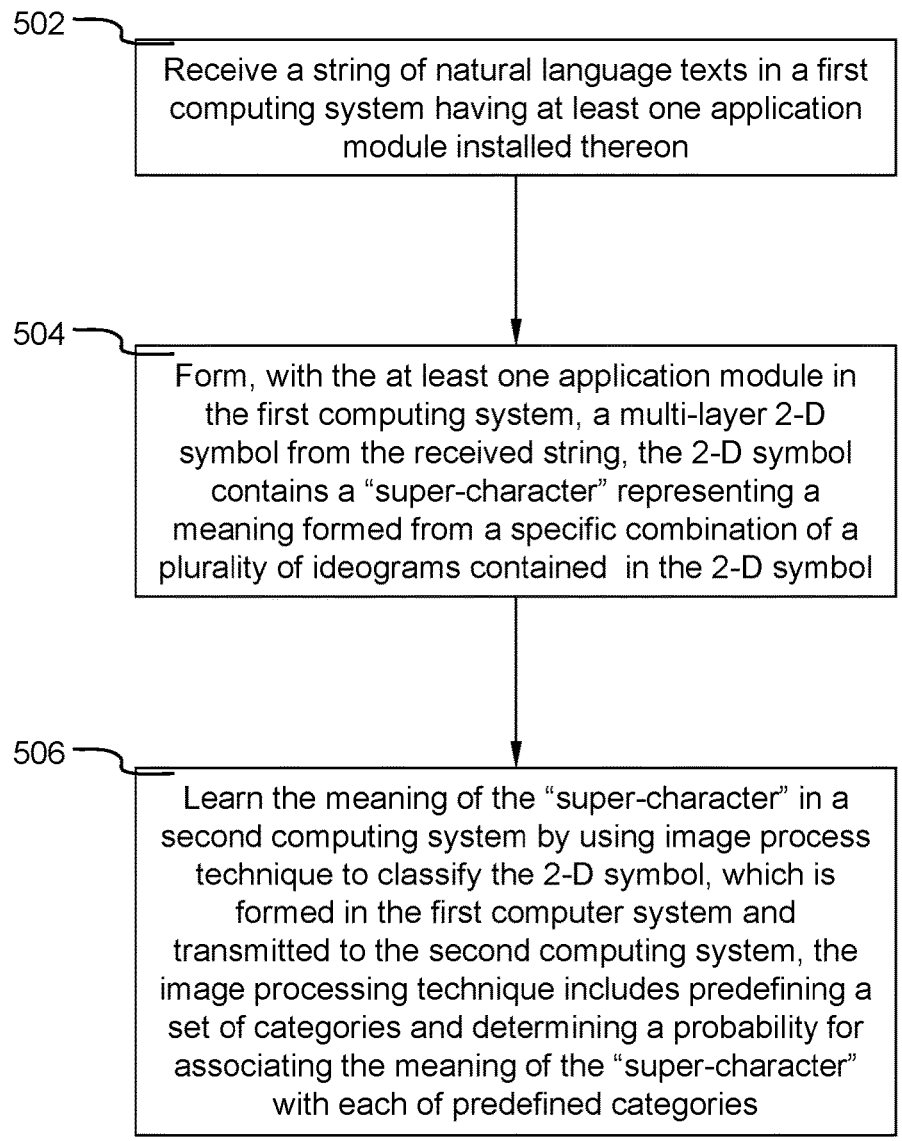
FIG. 5A is a flowchart illustrating an example process of machine learning of written natural languages using a multi-layer two-dimensional symbol in accordance with an embodiment of the invention.
Figure 5B:
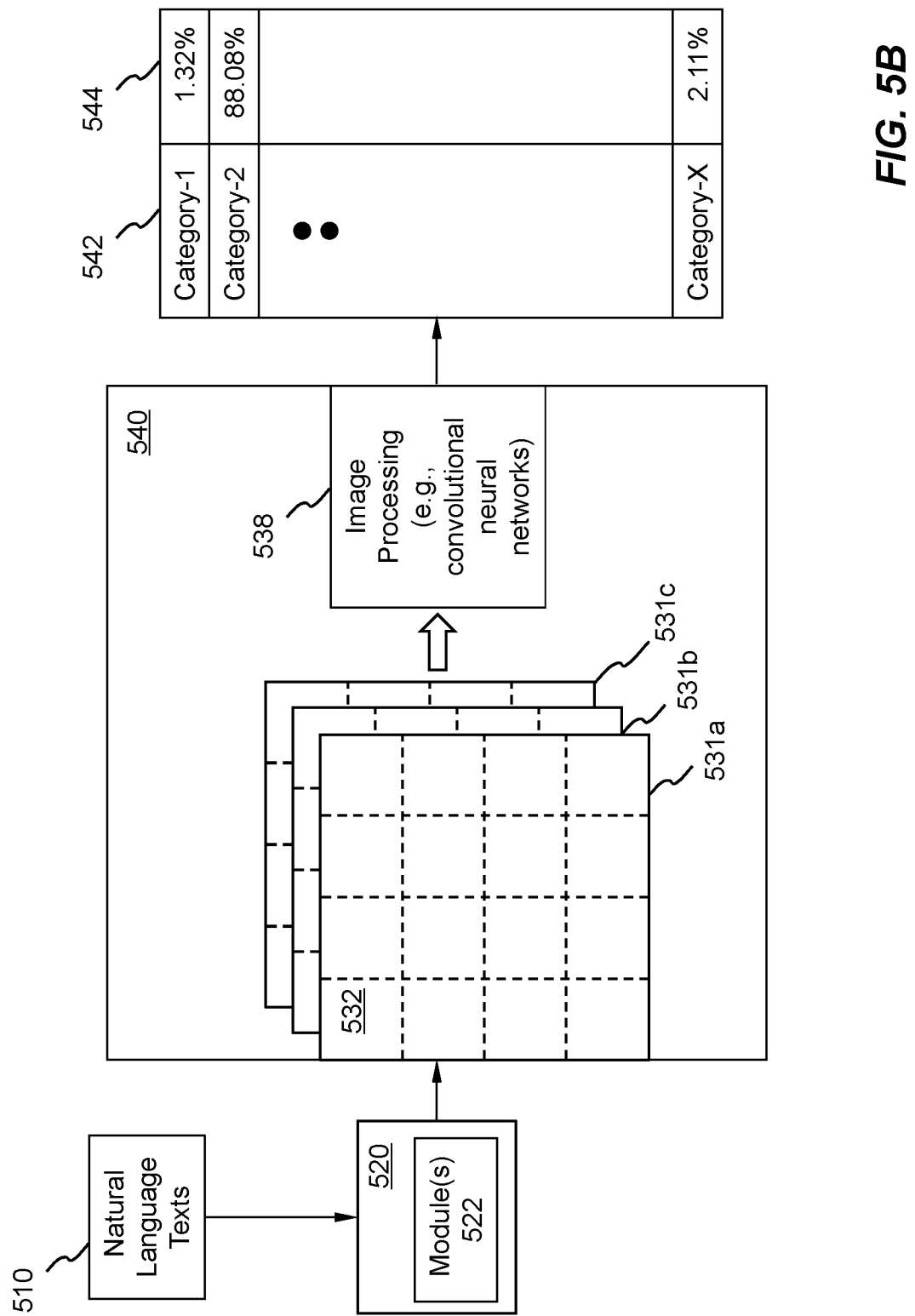
FIG. 5B is a schematic diagram showing an example natural language processing via a multi-layer two-dimensional symbol with image processing technique in accordance with an embodiment of the invention.

FIG. 5A is a flowchart illustrating an example process 500 of machine learning of written natural languages using a multi-layer two-dimensional symbol in accordance with an embodiment of the invention. Process 500 can be implemented in software as an application module installed in at least one computer system. Process 500 may also be implemented in hardware (e.g., integrated circuits). FIG. 5B is a schematic diagram showing example natural language processing via a multi-layer two-dimensional symbol with image process technique in accordance with an embodiment of the invention.

Process 500 starts at action 502 by receiving a string of natural language texts 510 in a first computing system 520 having at least one application module 522 installed thereon. The first computing system 520 can be a general computer capable of converting a string of natural language texts 510 to a multi-layer two-dimensional symbol 531a-531c (i.e., an image contained in a matrix of N×N pixels of data in multiple layers).

Next, at action 504, a multi-layer two-dimensional symbol 531a-531c containing M×M ideograms 532 (e.g., two-dimensional symbol 100 of FIG. 1) are formed from the received string 510 with the at least one application module 522 in the first computing system 520. M is a positive integer. Each two-dimensional symbol 531a-531c is a matrix of N×N pixels of data containing a "super-character". The matrix is divided into M×M sub-matrices representing respective M×M ideograms. "Super-character" represents a meaning formed from a specific combination of a plurality of ideograms contained in the multi-layer two-dimensional symbol 531a-531c. M and N are positive integers, and N is preferably a multiple of M. More details of forming the multi-layer two-dimensional symbol are shown in FIG. 6 and corresponding descriptions.

Finally, at action 506, the meaning of the "super-character" contained in the multi-layer two-dimensional symbol 531a-531c is learned in a second computing system 540 by using an image processing technique 538 to classify the multi-layer two-dimensional symbol 531a-531c, which is formed in the first computing system 520 and transmitted to the second computing system 540. The second computing system 540 is capable of image processing of imagery data such as the multi-layer two-dimensional symbol 531a-531c.

Transmitting the multi-layer 2-D symbol 531a-531c can be performed with many well-known manners, for example, through a network either wired or wireless.

In one embodiment, the first computing system 520 and the second computing system 540 are the same computing system (not shown).

In yet another embodiment, the first computing system 520 is a general computing system while the second computing system 540 is a CNN based computing system 400 implemented as integrated circuits on a semi-conductor chip shown in FIG. 4A.

The image processing technique 538 includes predefining a set of categories 542 (e.g., "Category-1", "Category-2", . . . "Category-X" shown in FIG. 5B). As a result of performing the image processing technique 538, respective probabilities 544 of the categories are determined for associating each of the predefined categories 542 with the meaning of the "super-character". In the example shown in FIG. 5B, the highest probability of 88.08 percent is shown for "Category-2". In other words, the multi-layer two-dimensional symbol 531a-531c contains a "super-character" whose meaning has a probability of 88.08 percent associated with "Category-2" amongst all the predefined categories 544.

In another embodiment, predefined categories contain commands that can activate a sequential instructions on a smart electronic device (e.g., computing device, smart phone, smart appliance, etc.). For example, a multi-layer two-dimensional symbol is formed from a string of 16 logosyllabic Chinese characters. "Super-character" in the multi-layer 2-D symbol thus contains 16 ideograms in three colors (i.e., red, green and blue). After applying image processing technique to imagery data of the 2-D symbol, a series of commands for smart electronic devices is obtained by classifying the imagery data with a set of predefined commands. In this particular example, the meaning of the 16 logosyllabic Chinese characters is "open an online map and find the nearest route to fast food". The series of commands may be as follows:
1) open "online map"
2) search "fast food near me"
3) enter
4) click "Go"

Figure 7:
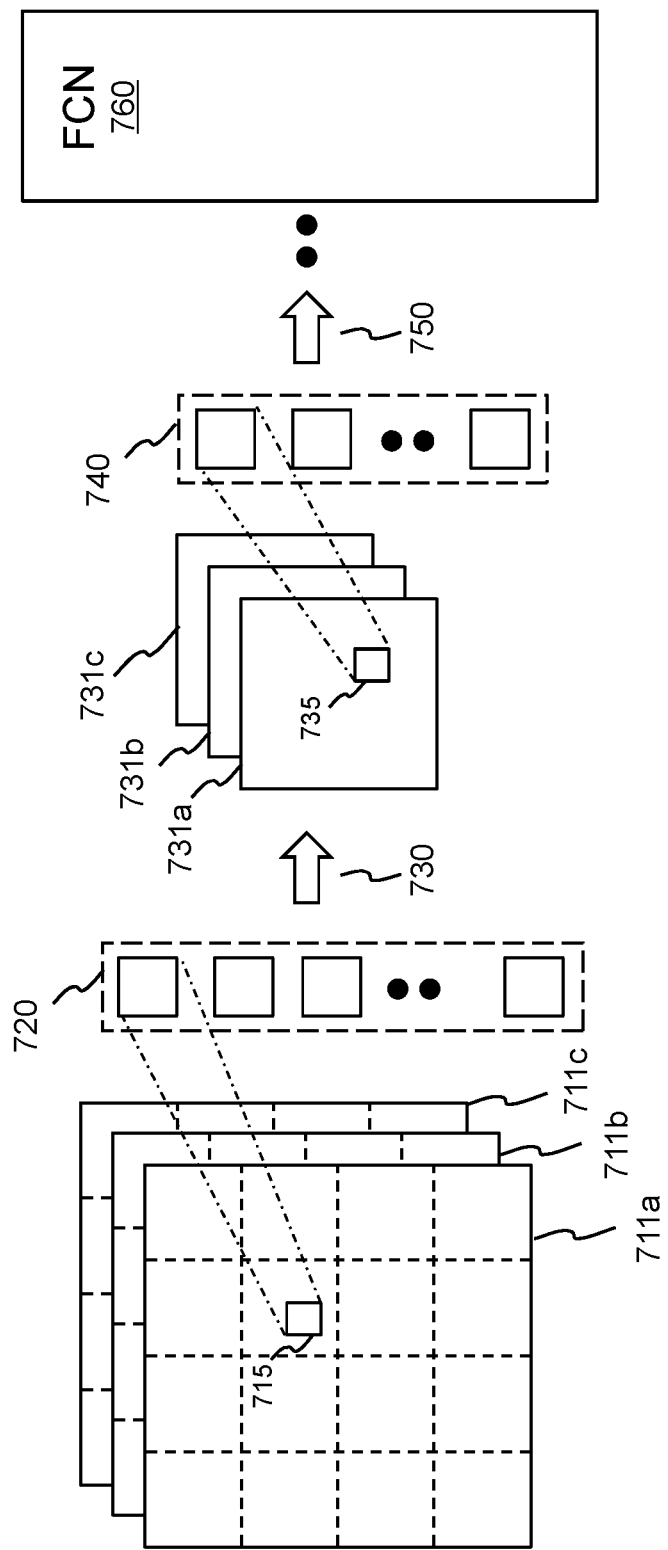
FIG. 7 is a schematic diagram showing an example image processing technique based on convolutional neural networks in accordance with an embodiment of the invention.

In one embodiment, image processing technique 538 comprises example convoluational neural networks shown in FIG. 7. In another embodiment, image processing technique 538 comprises support vector machine (SVM) with manual feature engineering on images of specific set of logosyllabic characters (e.g., Chinese characters).

Figure 6A:
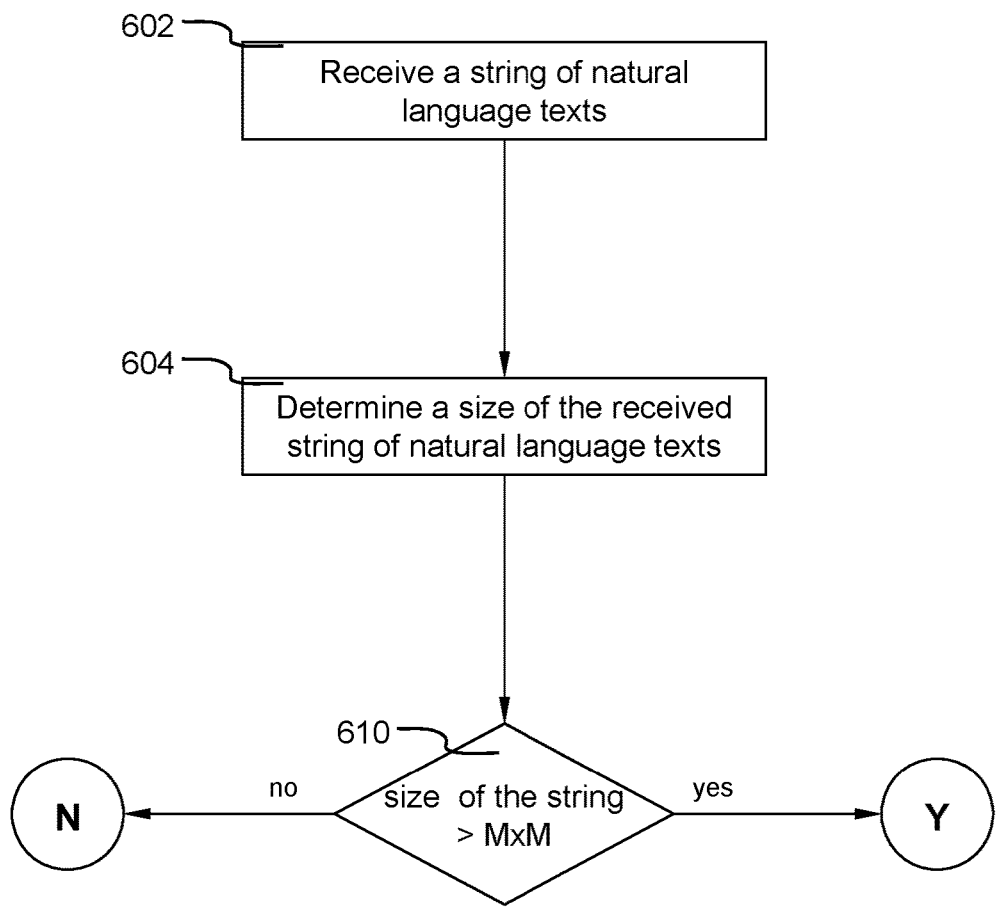
FIGS. 6A-6C are collectively a flowchart illustrating an example process of forming a two-dimensional symbol containing multiple ideograms from a string of natural language texts in accordance with an embodiment of the invention.
Figure 6B:
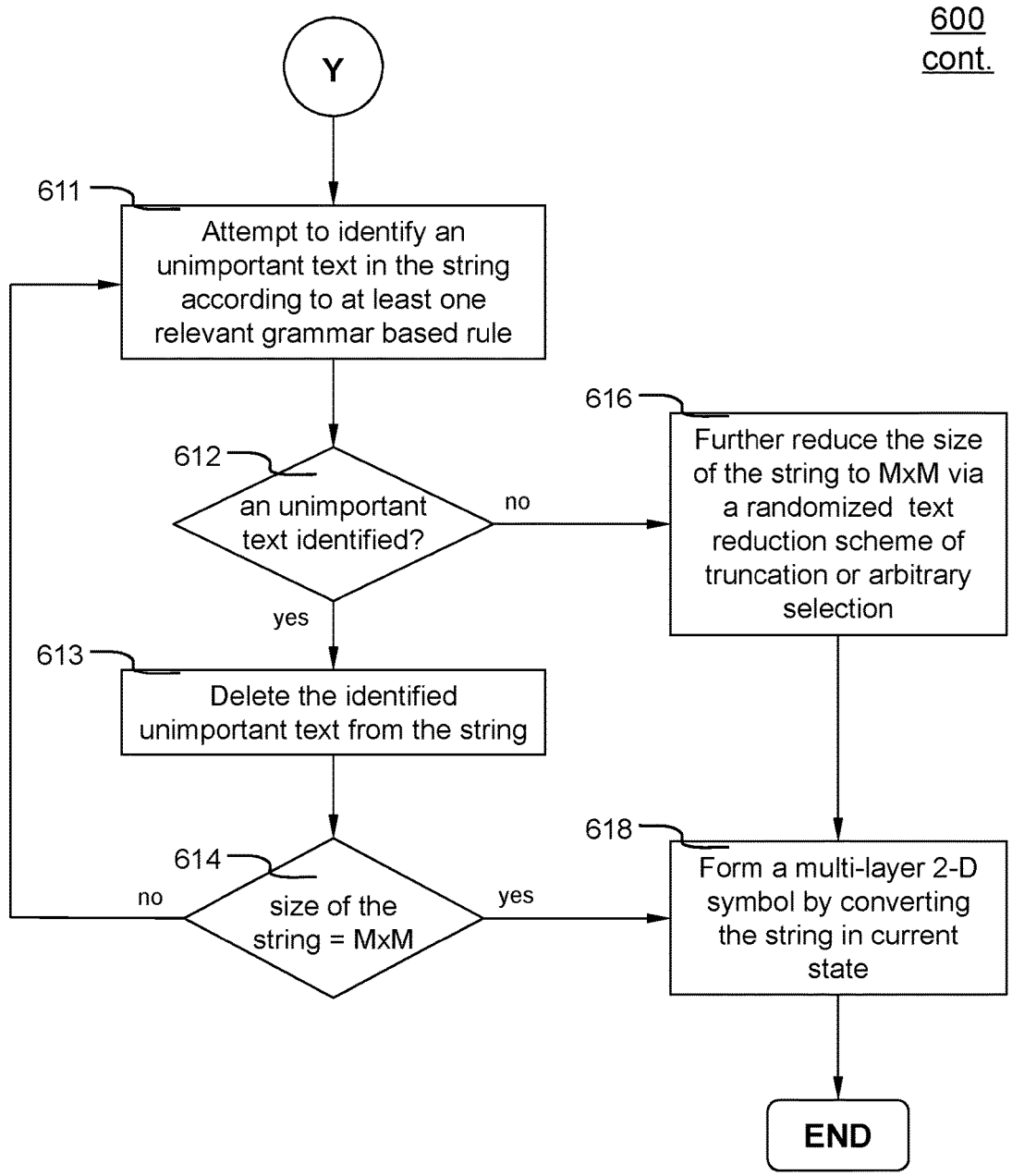
Figure 6C:
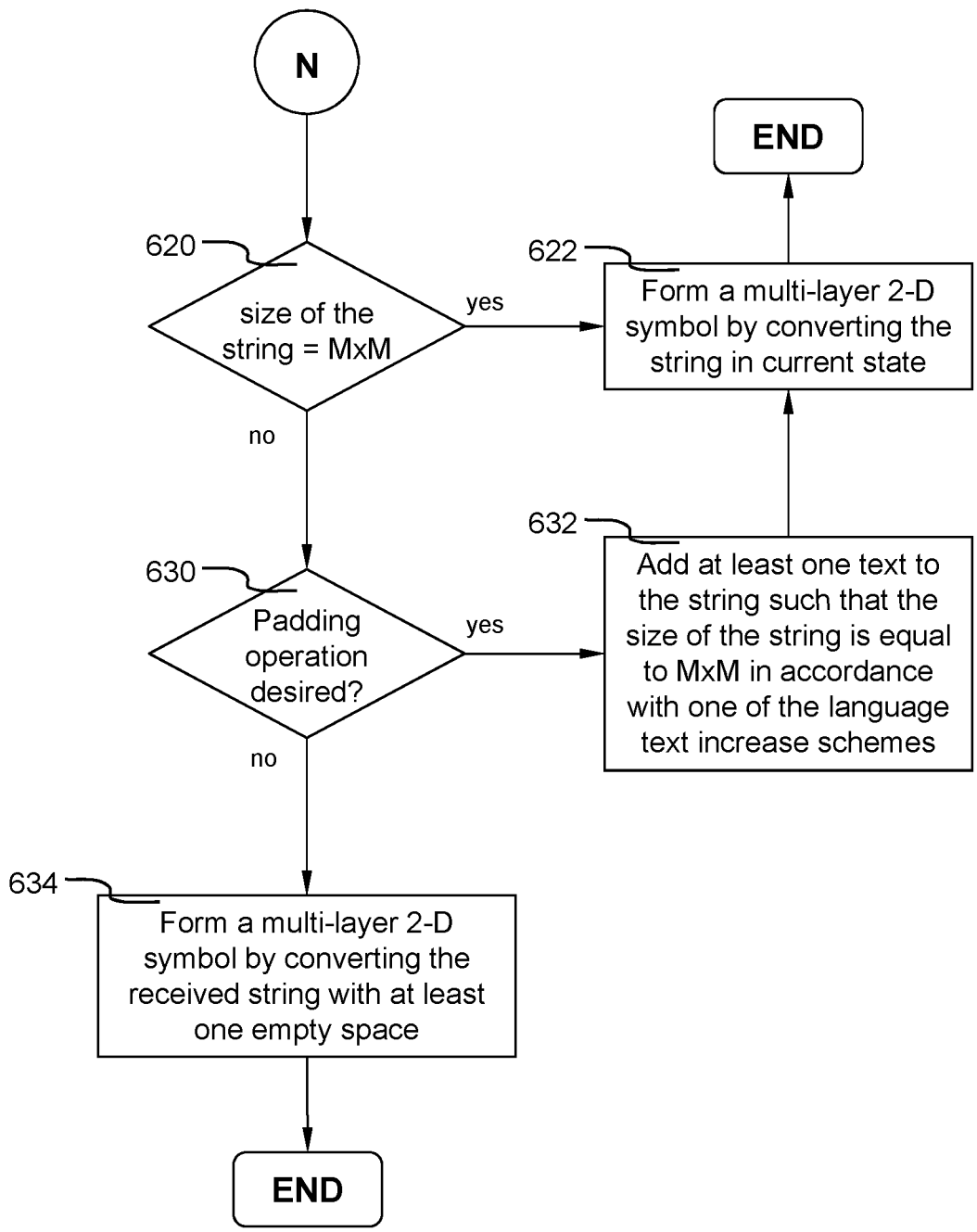

FIGS. 6A-6C are collectively a flowchart illustrating an example process 600 of forming a two-dimensional (2-D) symbol containing multiple ideograms from a string of natural language texts in accordance with an embodiment of the invention. Process 600 can be implemented in software as an application module installed in a computer system. Process 600 can also be implemented in hardware (e.g., integrated circuits).

Process 600 starts at action 602 by receiving a string of natural language texts in a computing system having at least one application module installed thereon. An example application module is a software that contains instructions for the computing system to perform the actions and decisions set forth in process 600. The string of natural language texts may include, but are not necessarily limited to, logosyllabic characters, numerals, special characters, western languages based on Latin letters, etc. The string of natural language texts can be inputted to the computing system via various well-known manners, for example, keyboard, mouse, voice-to-text, etc.

Next, at action 604, a size of the received string of natural language texts is determined. Then at decision 610, it is determined whether the size is greater than M×M (i.e., the maximum number of ideograms in the two-dimensional symbol). In one embodiment, M is 4 and M×M is therefore 16. In another embodiment, M is 8 and M×M is then 64.

When decision 610 is true, the received string is too large to be fit into the 2-D symbol and must be first reduced in accordance with at least one language text reduction scheme described below.

Process 600 follows the 'yes' branch to action 611. Process 600 attempts to identify an unimportant text in the string according to at least one relevant grammar based rule. The relevant grammar based rule is associated with the received string of natural language texts. For example, when the natural language is Chinese, the relevant grammar is the Chinese grammar. Next, at decision 612, it is determined whether an unimportant text is identified or not. If 'yes', at action 613, the identified unimportant text is deleted from the string, and therefore the size of the string is reduced by one. At decision 614, the size of the string is determined if it is equal to M×M. If not, process 600 goes back to repeat the loop of action 611, decision 612, action 613 and decision 614. If decision 614 is true, process 600 ends after performing action 618, in which a multi-layer 2-D symbol is formed by converting the string in its current state (i.e., may have one or more unimportant texts deleted).

During the aforementioned loop 611-614, if there is no more unimportant text in the received string, decision 612 becomes 'no'. Process 600 moves to action 616 to further reduce the size of the string to M×M via a randomized text reduction scheme, which can be truncation or arbitrary selection. At action 618, a multi-layer 2-D symbol is formed by converting the string in its current state. Process 600 ends thereafter.

The randomized text reduction scheme and the aforementioned scheme of deleting unimportant text are referred to as the at least one language text reduction scheme.

Referring back to decision 610, if it is false, process 600 follows the 'no' branch to decision 620. If the size of the received string is equal to M×M, decision 620 is true. Process 600 moves to action 622, in which a multi-layer 2-D symbol is formed by converting the the received string. Process 600 ends thereafter.

If decision 620 is false (i.e., the size of the received string is less than M×M), process 600 moves to another decision 630, in which it is determined whether a padding operation of the 2-D symbol is desired. If 'yes', at action 632, the string is padded with at least one text to increase the size of the string to M×M in accordance with at least one language text increase scheme. In other words, at least one text is added to the string such that the size of the string is equal to M×M. In one embodiment, the language text increase scheme requires one or more key texts be identified from the received string first. Then one or more identified key texts are repeatedly appended to the received string. In another embodiment, the language text increase scheme requires one or more texts from the receiving string be repeatedly appended to the string. Next, action 622 is performed to form a multi-layer 2-D symbol by converting the padded string (i.e., the received string plus at least one additional text). Process 600 ends thereafter.

If decision 630 is false, process 600 ends after performing action 634. A multi-layer 2-D symbol is formed by converting the received string, which has a size less than M×M. As a result, the 2-D symbol contains at least one empty space. In one embodiment, the multi-layer two-dimensional symbol 531a-531c contains three layers for red, green and blue hues. Each pixel in each layer of the two-dimension symbol contains K-bit. In one embodiment, K=8 for supporting true color, which contains 256 shades of red, green and blue. In another embodiment, K=5 for a reduced color map having 32 shades of red, green and blue.

FIG. 7 is a schematic diagram showing an example image processing technique based on convolutional neural networks in accordance with an embodiment of the invention.

Based on convolutional neural networks, a multi-layer two-dimensional symbol 711a-711c as input imagery data is processed with convolutions using a first set of filters or weights 720. Since the imagery data of the 2-D symbol 711a-711c is larger than the filters 720. Each corresponding overlapped sub-region 715 of the imagery data is processed. After the convolutional results are obtained, activation may be conducted before a first pooling operation 730. In one embodiment, activation is achieved with rectification performed in a rectified linear unit (ReLU). As a result of the first pooling operation 730, the imagery data is reduced to a reduced set of imagery data 731a-731c. For 2×2 pooling, the reduced set of imagery data is reduced by a factor of 4 from the previous set.

The previous convolution-to-pooling procedure is repeated. The reduced set of imagery data 731a-731c is then processed with convolutions using a second set of filters 740. Similarly, each overlapped sub-region 735 is processed. Another activation can be conducted before a second pooling operation 740. The convolution-to-pooling procedures are repeated for several layers and finally connected to a Fully Connected Networks (FCN) 760. In image classification, respective probabilities 544 of predefined categories 542 can be computed in FCN 760.

This repeated convolution-to-pooling procedure is trained using a known dataset or database. For image classification, the dataset contains the predefined categories. A particular set of filters, activation and pooling can be tuned and obtained before use for classifying an imagery data, for example, a specific combination of filter types, number of filters, order of filters, pooling types, and/or when to perform activation. In one embodiment, the imagery data is the multi-layer two-dimensional symbol 711a-711c, which is form from a string of natural language texts.

In one embodiment, convolutional neural networks are based on a Visual Geometry Group (VGG16) architecture neural nets.

Figure 8:
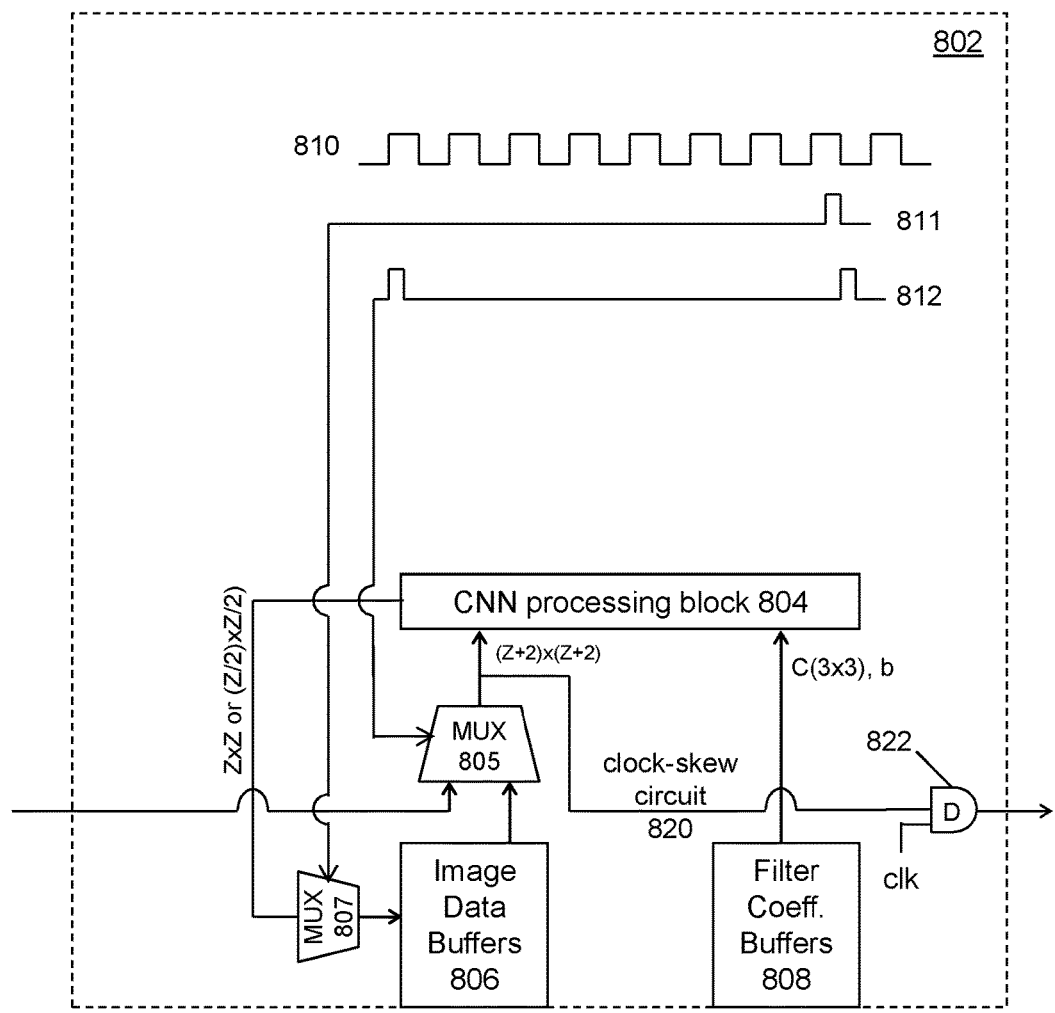
FIG. 8 is a diagram showing an example CNN processing engine in a CNN based integrated circuit, according to one embodiment of the invention.

More details of a CNN processing engine 802 in a CNN based integrated circuit are shown in FIG. 8. A CNN processing block 804 contains digital circuitry that simultaneously obtains Z×Z convolution operations results by performing 3×3 convolutions at Z×Z pixel locations using imagery data of a (Z+2)-pixel by (Z+2)-pixel region and corresponding filter coefficients from the respective memory buffers. The (Z+2)-pixel by (Z+2)-pixel region is formed with the Z×Z pixel locations as an Z-pixel by Z-pixel central portion plus a one-pixel border surrounding the central portion. Z is a positive integer. In one embodiment, Z equals to 14 and therefore, (Z+2) equals to 16, Z×Z equals to 14×14=196, and Z/2 equals 7.

Figure 9:
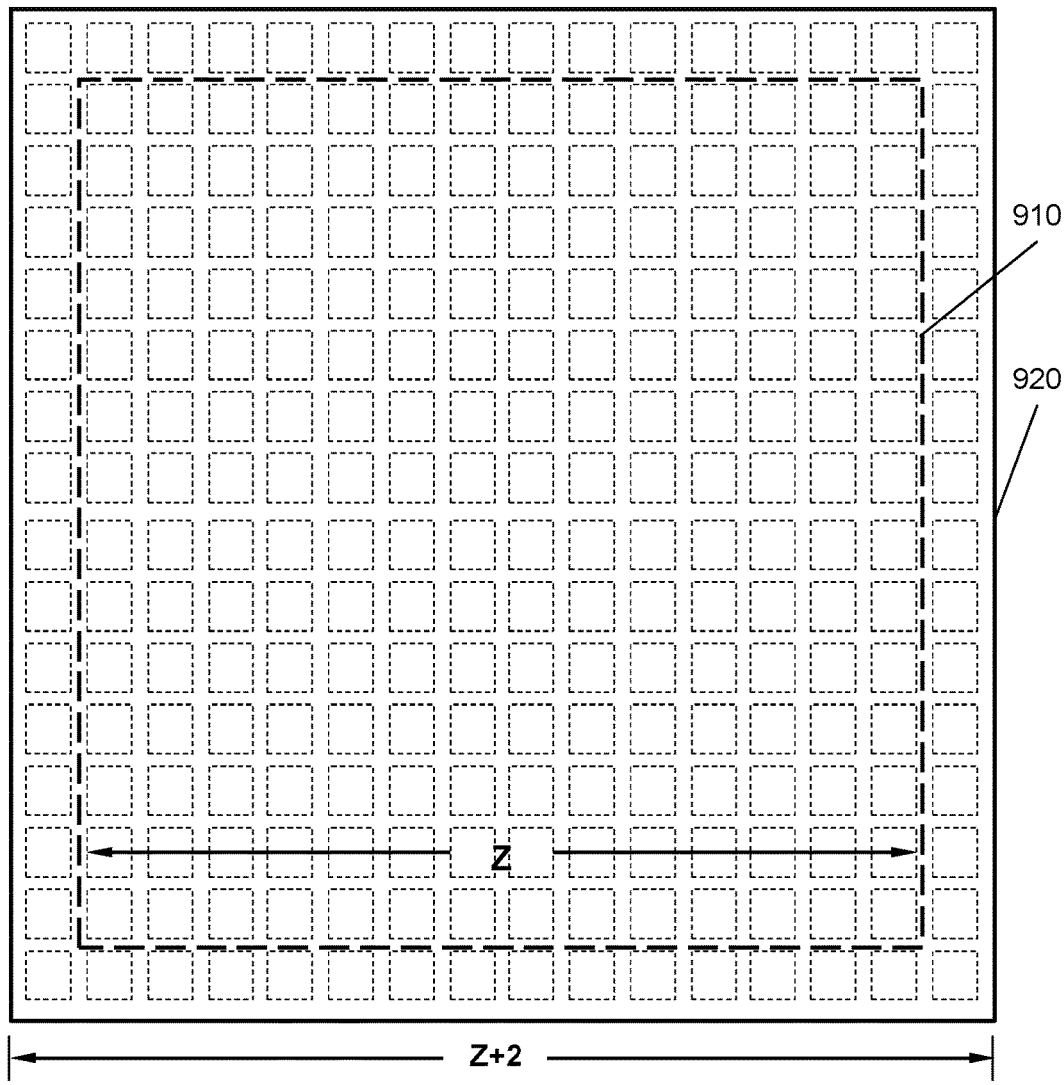
FIG. 9 is a diagram showing an example imagery data region within the example CNN processing engine of FIG. 8, according to an embodiment of the invention.

FIG. 9 is a diagram showing a diagram representing (Z+2)-pixel by (Z+2)-pixel region 910 with a central portion of Z×Z pixel locations 920 used in the CNN processing engine 802.

In order to achieve faster computations, few computational performance improvement techniques have been used and implemented in the CNN processing block 804. In one embodiment, representation of imagery data uses as few bits as practical (e.g., 5-bit representation). In another embodiment, each filter coefficient is represented as an integer with a radix point. Similarly, the integer representing the filter coefficient uses as few bits as practical (e.g., 12-bit representation). As a result, 3×3 convolutions can then be performed using fixed-point arithmetic for faster computations.

Each 3×3 convolution produces one convolution operations result, Out(m, n), based on the following formula:

$$Out(m, n) = \sum_{1 \leq i, j \leq 3} In(m, n, i, j) \times C(i, j) - b \quad (1)$$

where:
- m, n are corresponding row and column numbers for identifying which imagery data (pixel) within the (Z+2)-pixel by (Z+2)-pixel region the convolution is performed;
- In(m,n,i,j) is a 3-pixel by 3-pixel area centered at pixel location (m, n) within the region;
- C(i, j) represents one of the nine weight coefficients C(3×3), each corresponds to one of the 3-pixel by 3-pixel area;
- b represents an offset or bias coefficient; and
- j are indices of weight coefficients C(i, j).

Each CNN processing block 804 produces Z×Z convolution operations results simultaneously and, all CNN processing engines perform simultaneous operations. In one embodiment, the 3×3 weight or filter coefficients are each 12-bit while the offset or bias coefficient is 16-bit or 18-bit.

Figure 10A:
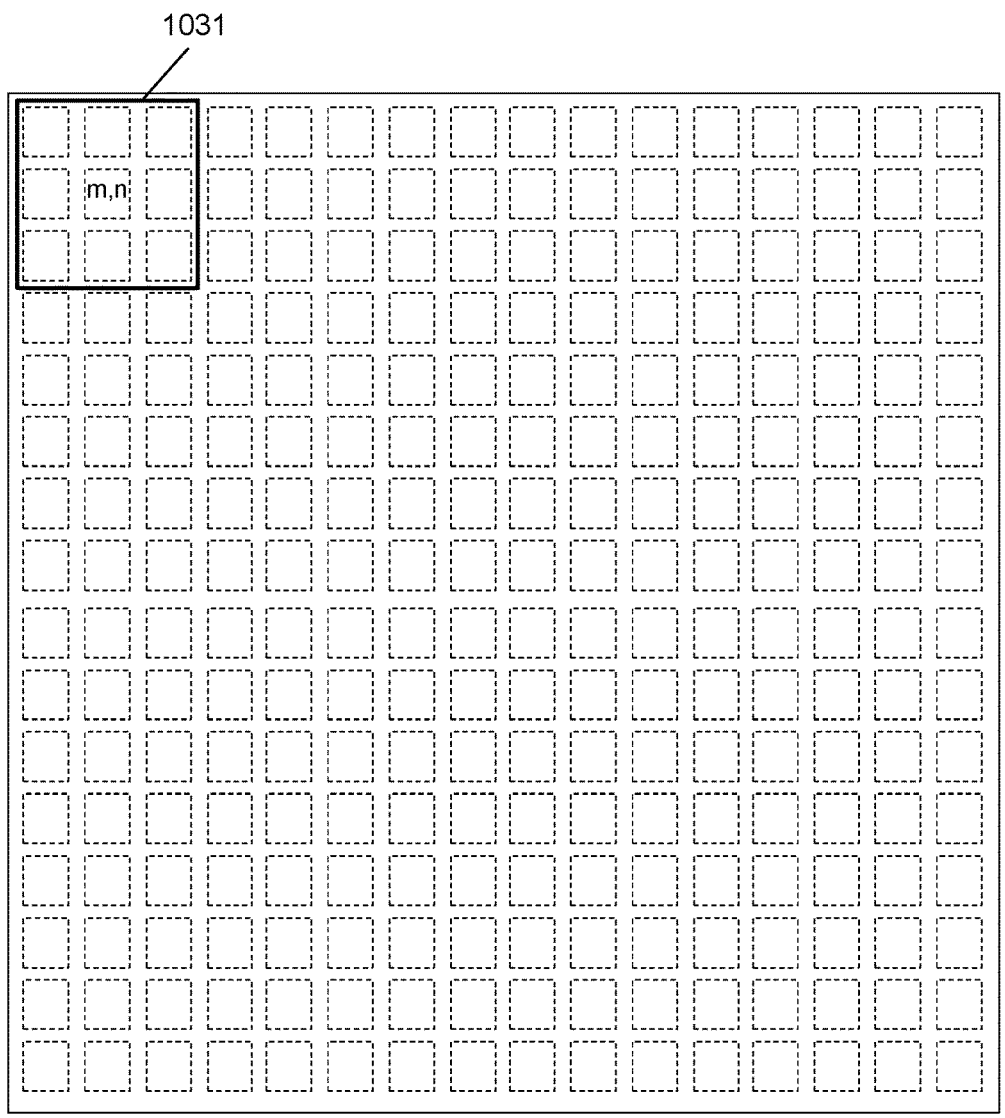
FIGS. 10A-10C are diagrams showing three example pixel locations within the example imagery data region of FIG. 9, according to an embodiment of the invention.
Figure 10B:
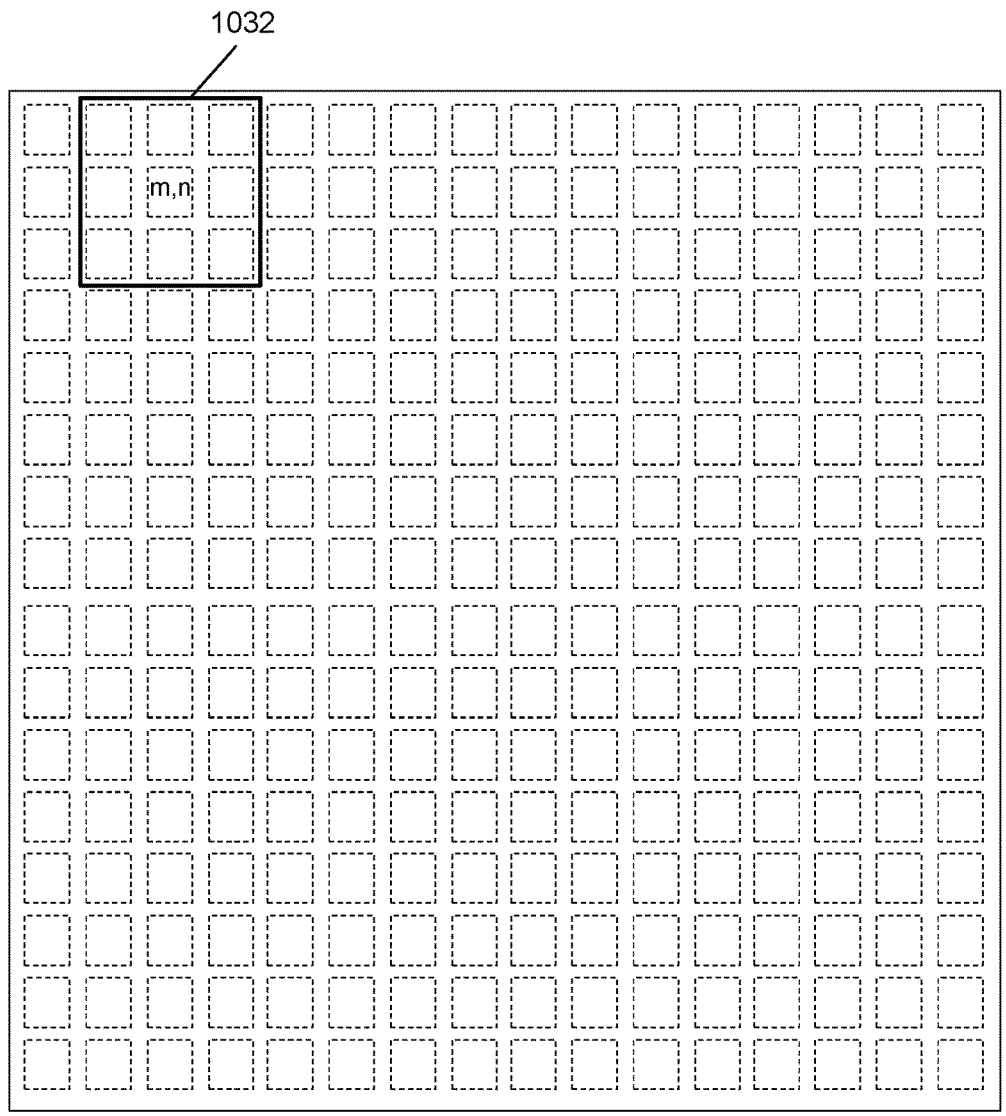
Figure 10C:
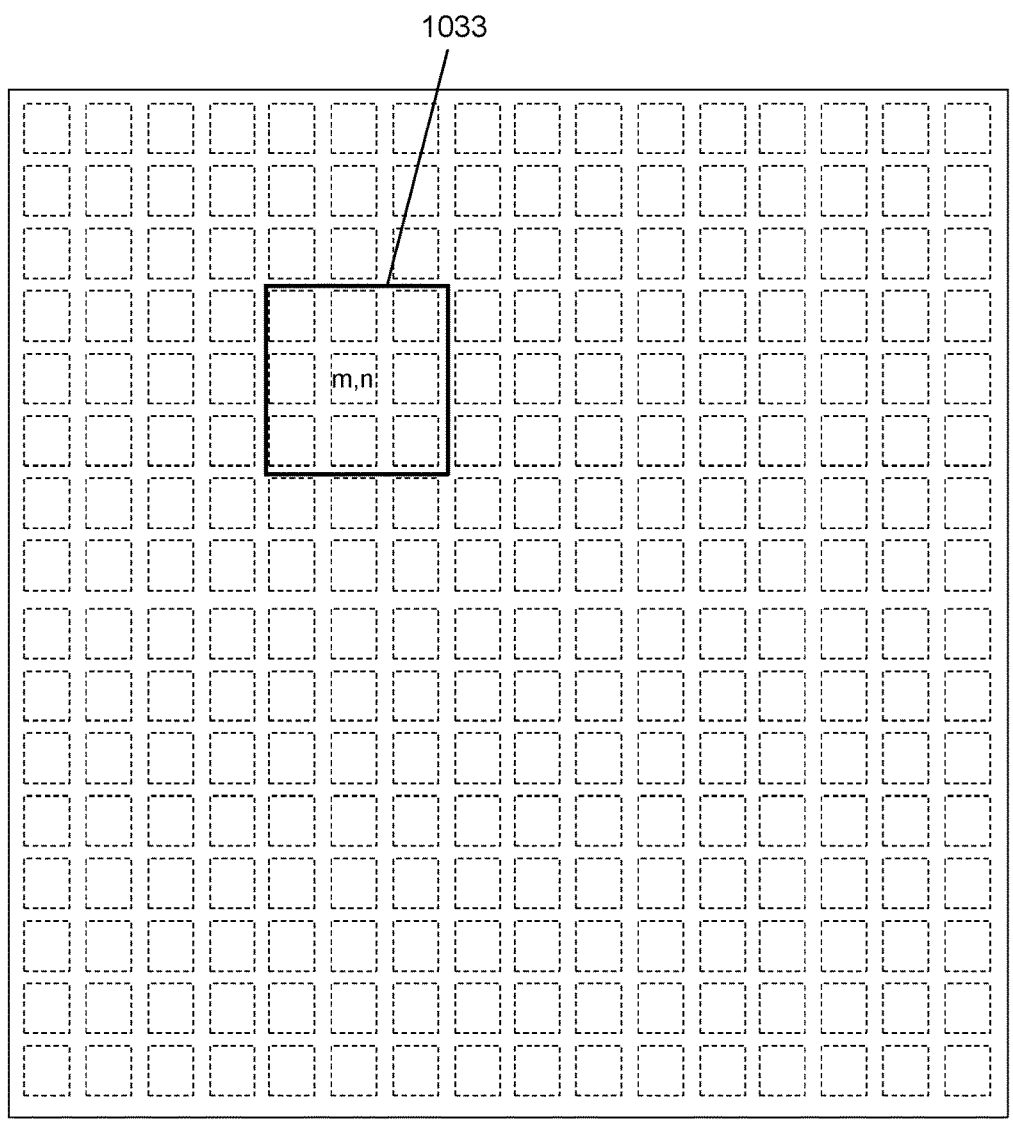

FIGS. 10A-10C show three different examples of the Z×Z pixel locations. The first pixel location 1031 shown in FIG. 10A is in the center of a 3-pixel by 3-pixel area within the (Z+2)-pixel by (Z+2)-pixel region at the upper left corner. The second pixel location 1032 shown in FIG. 10B is one pixel data shift to the right of the first pixel location 1031. The third pixel location 1033 shown in FIG. 10C is a typical example pixel location. Z×Z pixel locations contain multiple overlapping 3-pixel by 3-pixel areas within the (Z+2)-pixel by (Z+2)-pixel region.

Figure 11:
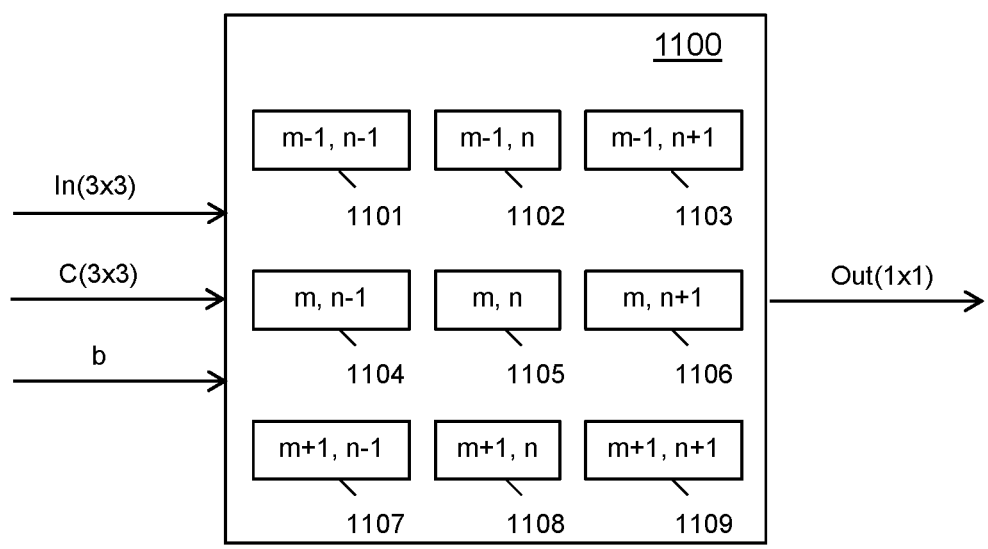
FIG. 11 is a diagram illustrating an example data arrangement for performing 3×3 convolutions at a pixel location in the example CNN processing engine of FIG. 8, according to one embodiment of the invention.

To perform 3×3 convolutions at each sampling location, an example data arrangement is shown in FIG. 11. Imagery data (i.e., In(3×3)) and filter coefficients (i.e., weight coefficients C(3×3) and an offset coefficient b) are fed into an example CNN 3×3 circuitry 1100. After 3×3 convolutions operation in accordance with Formula (1), one output result (i.e., Out(1×1)) is produced. At each sampling location, the imagery data In(3×3) is centered at pixel coordinates (m, n) 1105 with eight immediate neighbor pixels 1101-1104, 1106-1109.

Imagery data are stored in a first set of memory buffers 806, while filter coefficients are stored in a second set of memory buffers 808. Both imagery data and filter coefficients are fed to the CNN block 804 at each clock of the digital integrated circuit. Filter coefficients (i.e., C(3×3) and b) are fed into the CNN processing block 804 directly from the second set of memory buffers 808. However, imagery data are fed into the CNN processing block 804 via a multiplexer MUX 805 from the first set of memory buffers 806. Multiplexer 805 selects imagery data from the first set of memory buffers based on a clock signal (e.g., pulse 812).

Otherwise, multiplexer MUX 805 selects imagery data from a first neighbor CNN processing engine (from the left side of FIG. 8 not shown) through a clock-skew circuit 820.

At the same time, a copy of the imagery data fed into the CNN processing block 804 is sent to a second neighbor CNN processing engine (to the right side of FIG. 8 not shown) via the clock-skew circuit 820. Clock-skew circuit 820 can be achieved with known techniques (e.g., a D flip-flop 822).

After 3×3 convolutions for each group of imagery data are performed for predefined number of filter coefficients, convolution operations results Out(m, n) are sent to the first set of memory buffers via another multiplex MUX 807 based on another clock signal (e.g., pulse 811). An example clock cycle 810 is drawn for demonstrating the time relationship between pulse 811 and pulse 812. As shown pulse 811 is one clock before pulse 812, as a result, the 3×3 convolution operations results are stored into the first set of memory buffers after a particular block of imagery data has been processed by all CNN processing engines through the clock-skew circuit 820.

After the convolution operations result Out(m, n) is obtained from Formula (1), activation procedure may be performed. Any convolution operations result, Out(m, n), less than zero (i.e., negative value) is set to zero. In other words, only positive value of output results are kept. For example, positive output value 10.5 retains as 10.5 while −2.3 becomes 0. Activation causes non-linearity in the CNN based integrated circuits.

If a 2×2 pooling operation is required, the Z×Z output results are reduced to (Z/2)×(Z/2). In order to store the (Z/2)×(Z/2) output results in corresponding locations in the first set of memory buffers, additional bookkeeping techniques are required to track proper memory addresses such that four (Z/2)×(Z/2) output results can be processed in one CNN processing engine.

Figure 12A:
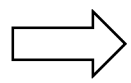
FIGS. 12A-12B are diagrams showing two example 2×2 pooling operations according to an embodiment of the invention.
Figure 12B:
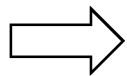
Figure 13:
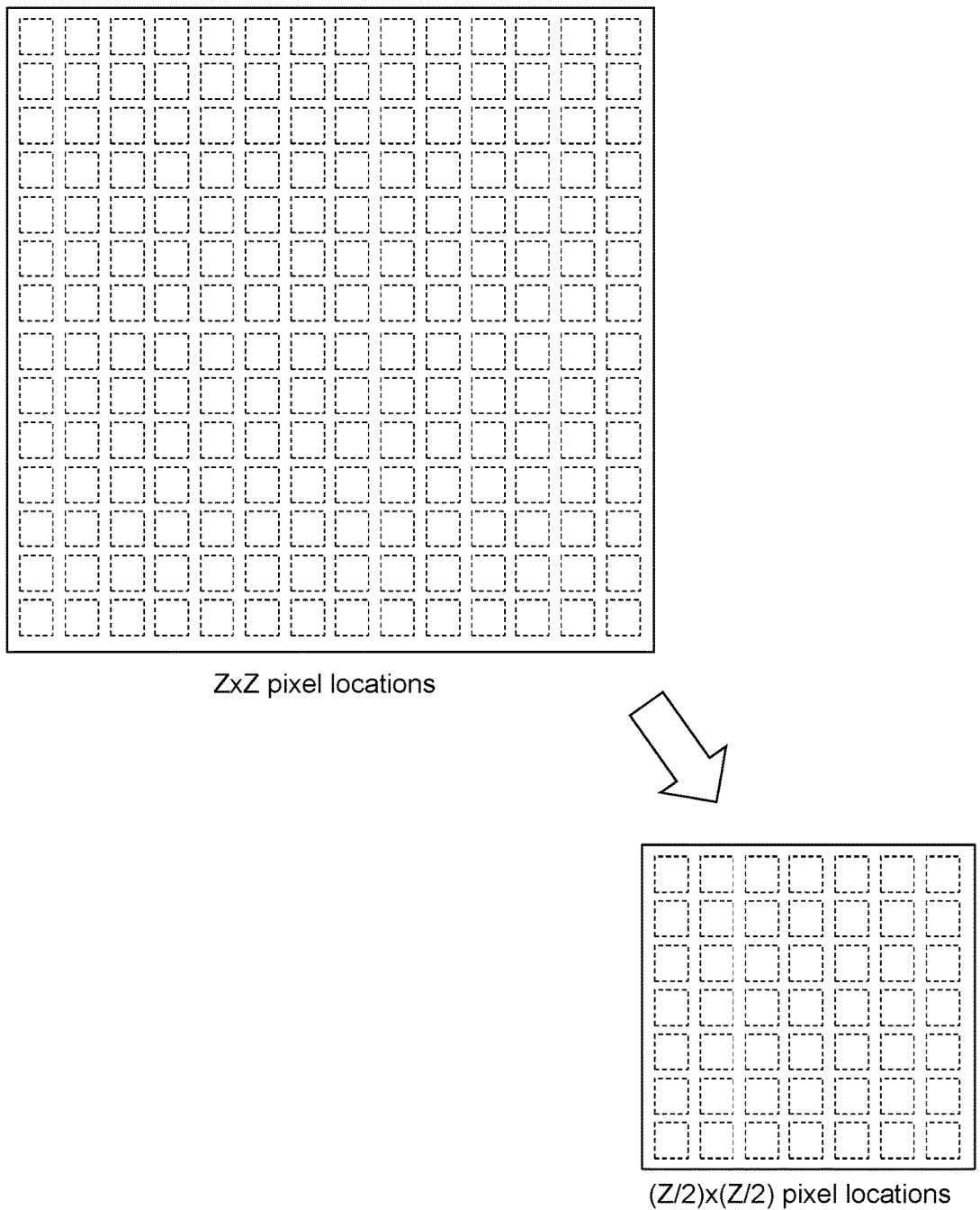
FIG. 13 is a diagram illustrating a 2×2 pooling operation of an imagery data in the example CNN processing engine of FIG. 8, according to one embodiment of the invention.

To demonstrate a 2×2 pooling operation, FIG. 12A is a diagram graphically showing first example output results of a 2-pixel by 2-pixel block being reduced to a single value 10.5, which is the largest value of the four output results. The technique shown in FIG. 12A is referred to as "max pooling". When the average value 4.6 of the four output results is used for the single value shown in FIG. 12B, it is referred to as "average pooling". There are other pooling operations, for example, "mixed max average pooling" which is a combination of "max pooling" and "average pooling". The main goal of the pooling operation is to reduce size of the imagery data being processed. FIG. 13 is a diagram illustrating Z×Z pixel locations, through a 2×2 pooling operation, being reduced to (Z/2)×(Z/2) locations, which is one fourth of the original size.

Figure 14A:
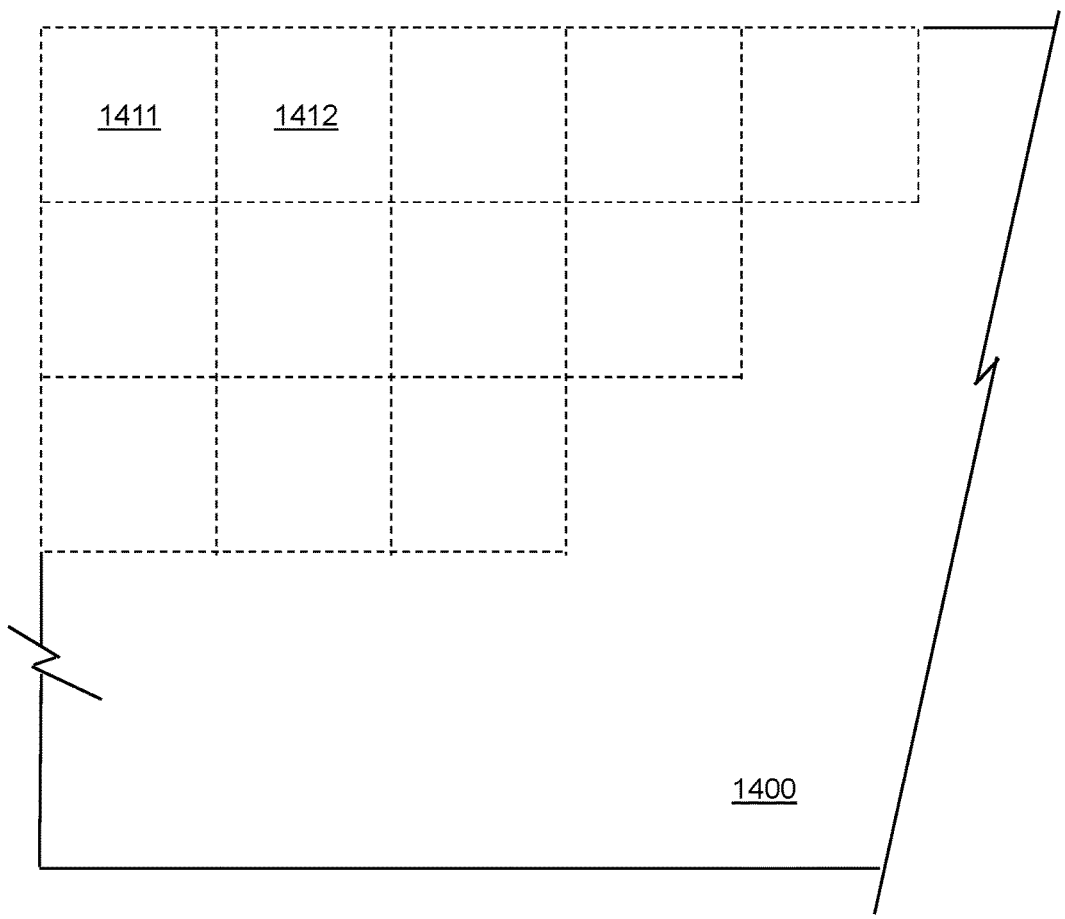
FIGS. 14A-14C are diagrams illustrating various examples of imagery data region within an input image, according to one embodiment of the invention.

An input image generally contains a large amount of imagery data. In order to perform image processing operations, an example input image 1400 (e.g., a two-dimensional symbol 100 of FIG. 1) is partitioned into Z-pixel by Z-pixel blocks 1411-1412 as shown in FIG. 14A. Imagery data associated with each of these Z-pixel by Z-pixel blocks is then fed into respective CNN processing engines. At each of the Z×Z pixel locations in a particular Z-pixel by Z-pixel block, 3×3 convolutions are simultaneously performed in the corresponding CNN processing block.

Although the invention does not require specific characteristic dimension of an input image, the input image may be required to resize to fit into a predefined characteristic dimension for certain image processing procedures. In an embodiment, a square shape with $(2^L \times Z)$-pixel by $(2^L \times Z)$-pixel is required. L is a positive integer (e.g., 1, 2, 3, 4, etc.). When Z equals 14 and L equals 4, the characteristic dimension is 224. In another embodiment, the input image is a rectangular shape with dimensions of $(2^I \times Z)$-pixel and $(2^J \times Z)$-pixel, where I and J are positive integers.

Figure 14B:
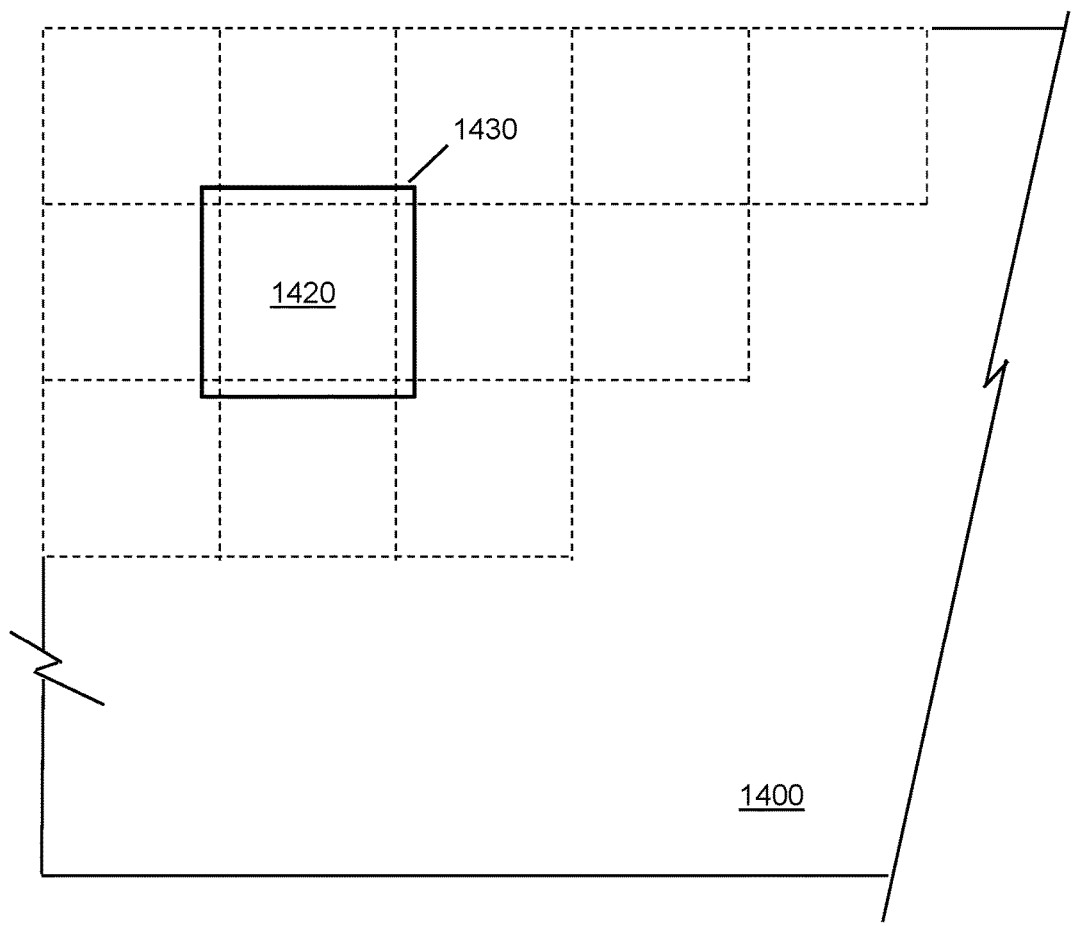

In order to properly perform 3×3 convolutions at pixel locations around the border of a Z-pixel by Z-pixel block, additional imagery data from neighboring blocks are required. FIG. 14B shows a typical Z-pixel by Z-pixel block 1420 (bordered with dotted lines) within a (Z+2)-pixel by (Z+2)-pixel region 1430. The (Z+2)-pixel by (Z+2)-pixel region is formed by a central portion of Z-pixel by Z-pixel from the current block, and four edges (i.e., top, right, bottom and left) and four corners (i.e., top-left, top-right, bottom-right and bottom-left) from corresponding neighboring blocks.

Figure 14C:
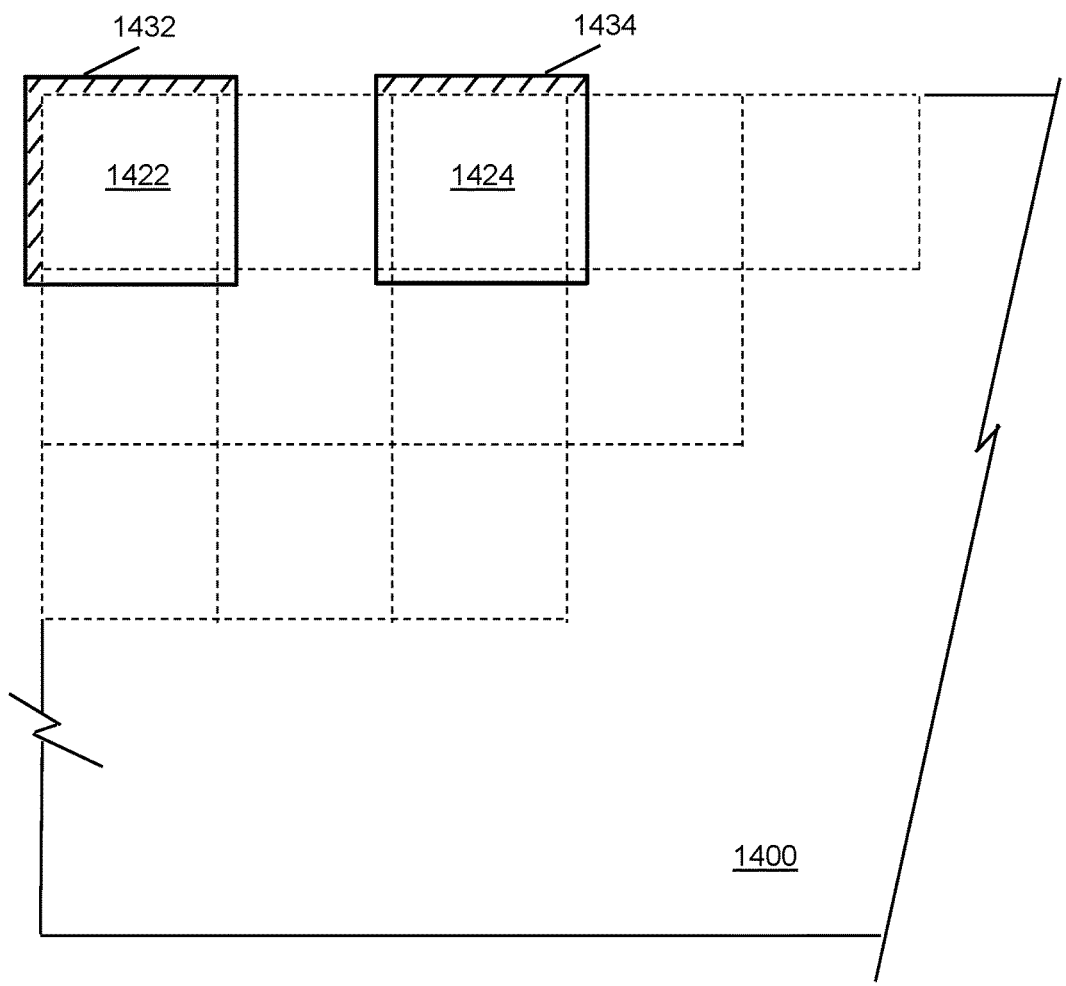

FIG. 14C shows two example Z-pixel by Z-pixel blocks 1422-1424 and respective associated (Z+2)-pixel by (Z+2)-pixel regions 1432-1434. These two example blocks 1422-1424 are located along the perimeter of the input image. The first example Z-pixel by Z-pixel block 1422 is located at top-left corner, therefore, the first example block 1422 has neighbors for two edges and one corner. Value "0"s are used for the two edges and three corners without neighbors (shown as shaded area) in the associated (Z+2)-pixel by (Z+2)-pixel region 1432 for forming imagery data. Similarly, the associated (Z+2)-pixel by (Z+2)-pixel region 1434 of the second example block 1424 requires "0"s be used for the top edge and two top corners. Other blocks along the perimeter of the input image are treated similarly. In other words, for the purpose to perform 3×3 convolutions at each pixel of the input image, a layer of zeros ("0" s) is added outside of the perimeter of the input image. This can be achieved with many well-known techniques. For example, default values of the first set of memory buffers are set to zero. If no imagery data is filled in from the neighboring blocks, those edges and corners would contain zeros.

Figure 15:
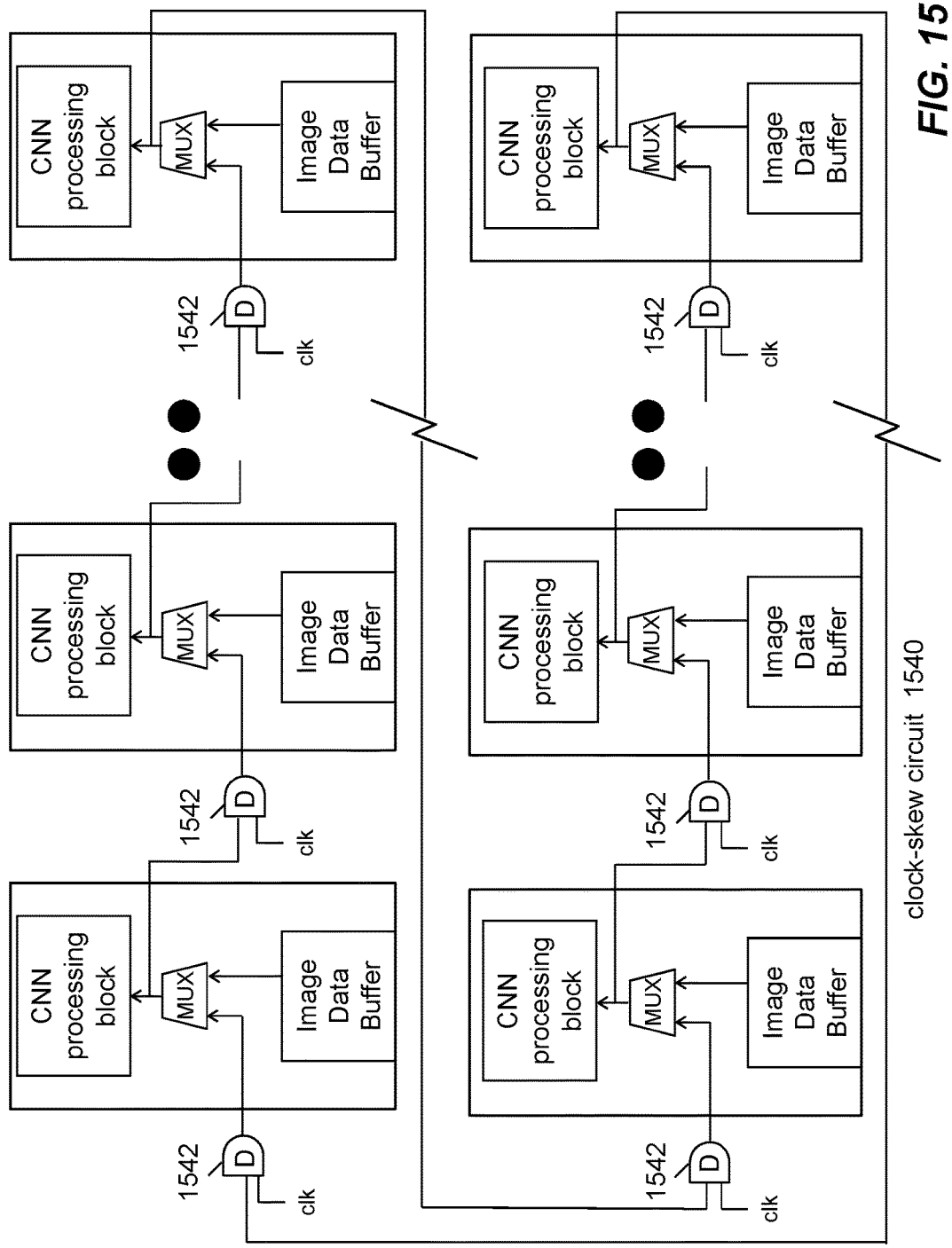
FIG. 15 is a diagram showing a plurality of CNN processing engines connected as a loop via an example clock-skew circuit in accordance of an embodiment of the invention.

When more than one CNN processing engine is configured on the integrated circuit. The CNN processing engine is connected to first and second neighbor CNN processing engines via a clock-skew circuit. For illustration simplicity, only CNN processing block and memory buffers for imagery data are shown. An example clock-skew circuit 1540 for a group of example CNN processing engines are shown in FIG. 15.

CNN processing engines connected via the second example clock-skew circuit 1540 to form a loop. In other words, each CNN processing engine sends its own imagery data to a first neighbor and, at the same time, receives a second neighbor's imagery data. Clock-skew circuit 1540 can be achieved with well-known manners. For example, each CNN processing engine is connected with a D flip-flop 1542.

Figure 16:
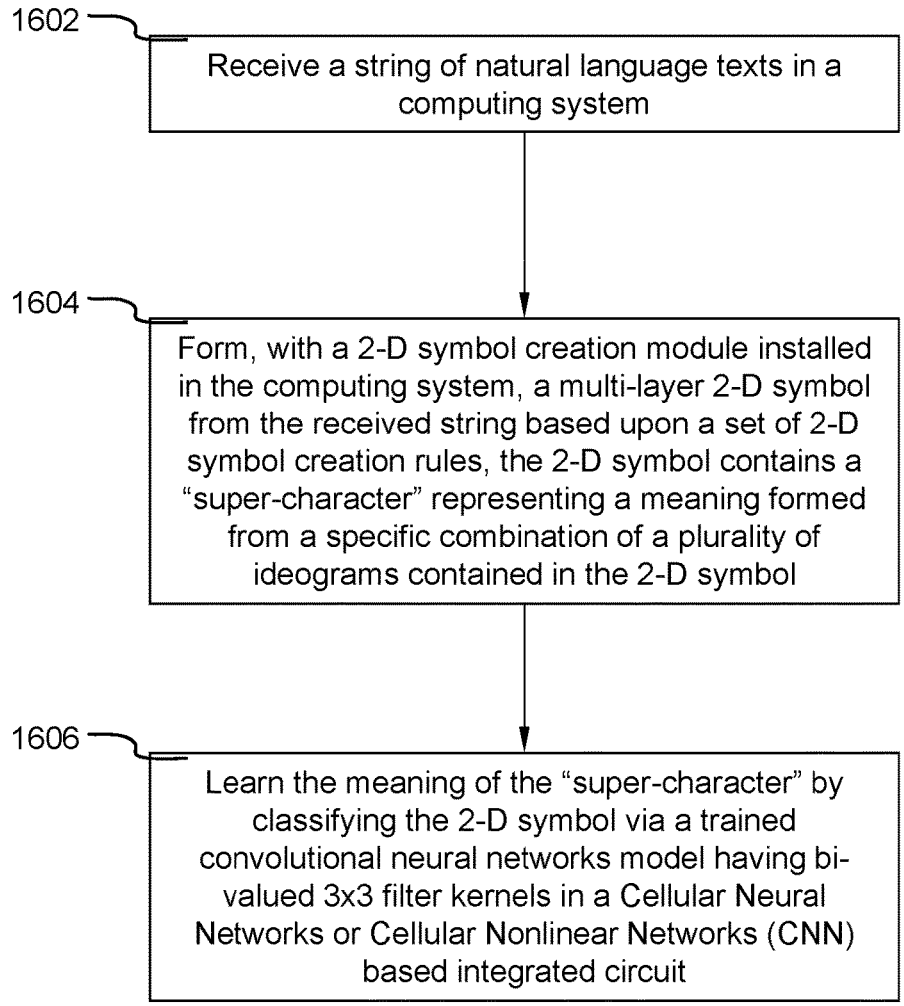
FIG. 16 is a flowchart illustrating an example process of natural language processing using a CNN based integrated circuit in accordance with an embodiment of the invention.

Referring now to FIG. 16, it is a flowchart illustrating an example process 1600 of natural language processing using a Cellular Neural Networks or Cellular Nonlinear Networks (CNN) based integrated circuit.

Process 1600 starts at action 1602 by receiving a string of written natural language texts in a computing system (e.g., a computer with multiple processing units). At action 1604, a multi-layer two-dimension (2-D) symbol is formed from the received string according to a set of 2-D symbol creation rules. The 2-D symbol contains a "super-character" representing a meaning formed from a specific combination of a plurality of ideograms contained in the 2-D symbol.

Details of an example multi-layer 2-D symbol 100 are described and shown in FIG. 1 and FIGS. 2A-2B. In order to accommodate a CNN based integrated circuit (e.g., example CNN based Integrated circuit 400 shown in FIGS. 4A-4B), each of the N×N pixel contains K-bit data, where K is a positive integer. In one embodiment, K is 5.

Figure 18:
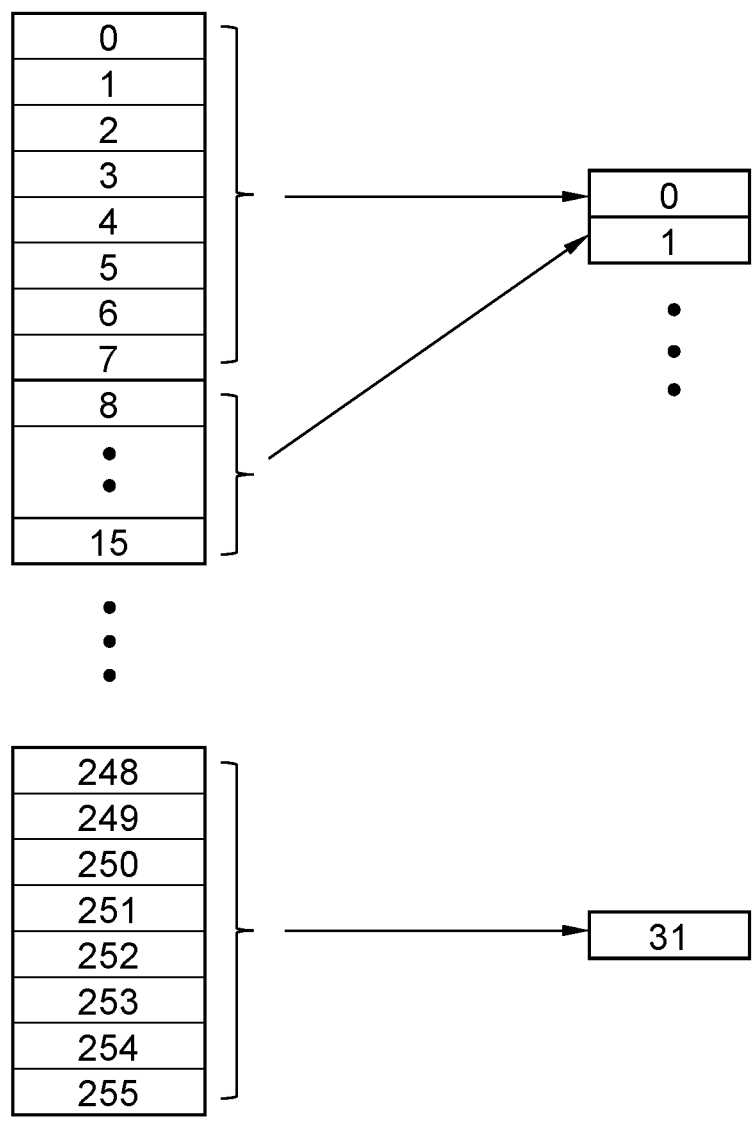
FIG. 18 is a diagram showing an example data conversion scheme.

FIG. 18 is a diagram showing an example data conversion scheme for converting an imagery data (e.g., 2-D symbol) from 8-bit [0-255] to 5-bit [0-31] per pixel. For example, bits 0-7 becomes 0, bits 8-15 becomes 1, etc.

Next, at action 1606, the meaning of the "super-character" is learned by classifying the 2-D symbol via a trained convolutional neural networks model having bi-valued 3×3 filter kernels in the CNN based integrated circuit.

Figure 17:
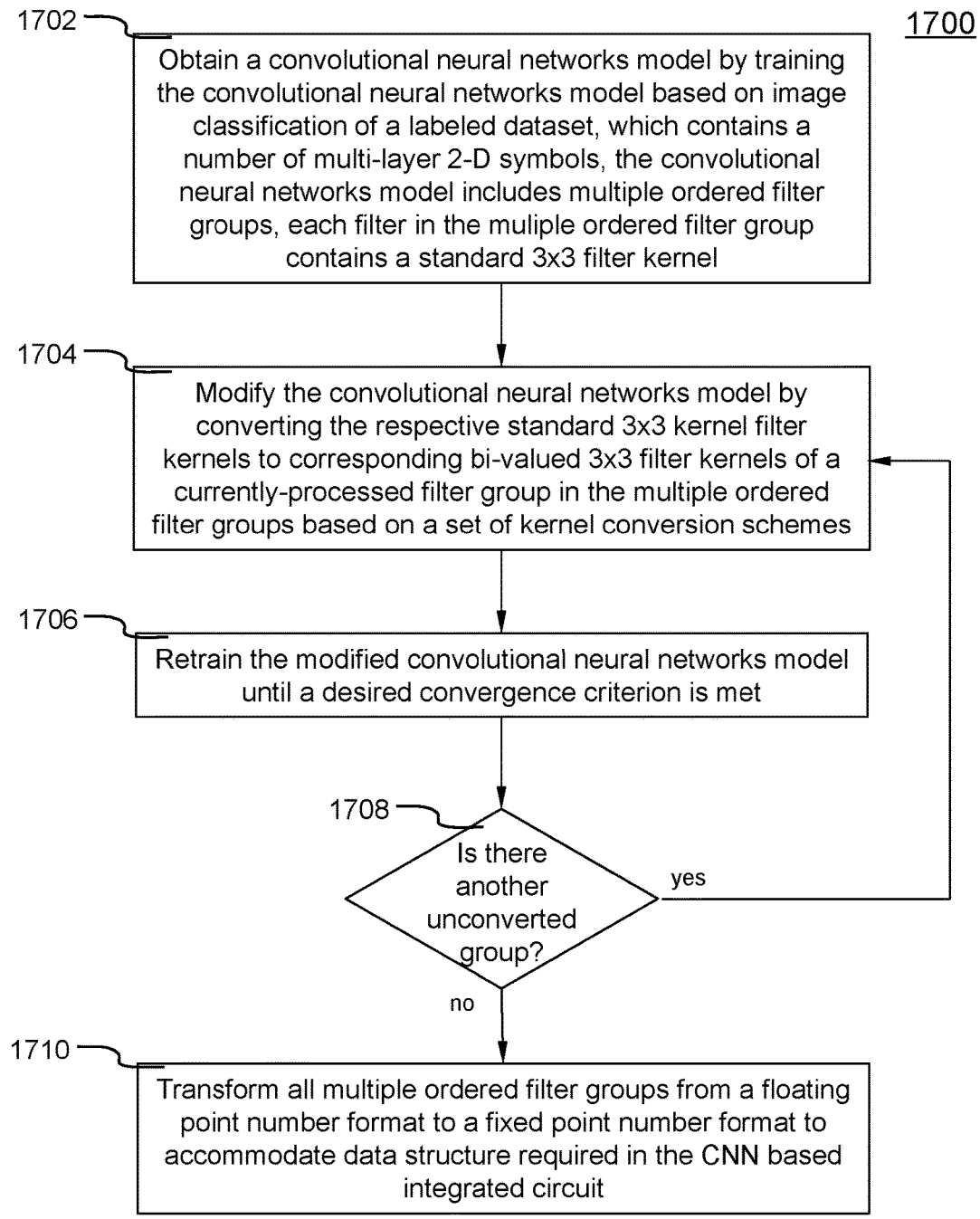
FIG. 17 is a flowchart illustrating an example process of achieving a trained convolutional neural networks model having bi-valued 3×3 filter kernels in accordance with an embodiment of the invention.

A trained convolutional neural networks model is achieved with an example set of operations 1700 shown in FIG. 17. At action 1702, a convolutional neural networks model is first obtained by training the convolutional neural networks model based on image classification of a labeled dataset, which contains a sufficiently large number of multi-layer 2-D symbols. For example, there are at least 4,000 2-D symbols for each category. In other words, each 2-D symbol in the labeled dataset is associated with a category to be classified. The convolutional neural networks model includes multiple ordered filter groups (e.g., each filter group corresponds to a convolutional layer in the convolutional neural networks model). Each filter in the multiple ordered filter groups contains a standard 3×3 filter kernel (i.e., nine coefficients in floating point number format (e.g., standard 3×3 filter kernel 1810 in FIG. 19)). Each of the nine coefficients can be any negative or positive real number (i.e., a number with fraction). The initial convolutional neural networks model may be obtained from many different frameworks including, but not limited to, Mxnet, caffe, tensorflow, etc.

Figure 19:
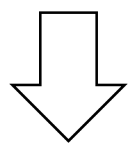
FIG. 19 is a diagram showing an example filter kernel conversion scheme in accordance with the invention.

Then, at action 1704, the convolutional neural networks model is modified by converting respective standard 3×3 filter kernels 1810, shown in FIG. 19, to corresponding bi-valued 3×3 filter kernels 1820 of a currently-processed filter group in the multiple ordered filter groups based on a set of kernel conversion schemes. In one embodiment, each of the nine coefficients C(i,j) in the corresponding bi-valued 3×3 filter kernel 1820 is assigned a value 'A', which equals to the average of absolute coefficient values multiplied by the sign of corresponding coefficients in the standard 3×3 filter kernel 1810 shown in following formula:

$$A = \sum_{1 \le i,j \le 3} |C(i, j)|/9 \quad (2)$$

Filter groups are converted one at a time in the order defined in the multiple ordered filter groups. In certain situation, two consecutive filter groups are optionally combined such that the training of the convolutional neural networks model is more efficient.

Next, at action 1706, the modified convolutional neural networks model is retrained until a desired convergence criterion is met or achieved. There are a number of well known convergence criteria including, but not limited to, completing a predefined number of retraining operation, converging of accuracy loss due to filter kernel conversion, etc. In one embodiment, all filter groups including those already converted in previous retraining operations can be changed or altered for fine tuning. In another embodiment, the already converted filter groups are frozen or unaltered during the retraining operation of the currently-processed filter group.

Process 1700 moves to decision 1708, it is determined whether there is another unconverted filter group. If 'yes', process 1700 moves back to repeat actions 1704-1706 until all filter groups have been converted. Decision 1708 becomes 'no' thereafter. At action 1710, coefficients of bi-valued 3×3 filter kernels in all filter groups are transformed from a floating point number format to a fixed point number format to accommodate the data structure required in the CNN based integrated circuit. Furthermore, the fixed point number is implemented as reconfigurable circuits in the CNN based integrated circuit. In one embodiment, the coefficients are implemented using a fixed point number format with 12-bit mantissa, 2-bit exponent and 1-bit for sign.

Figure 20:
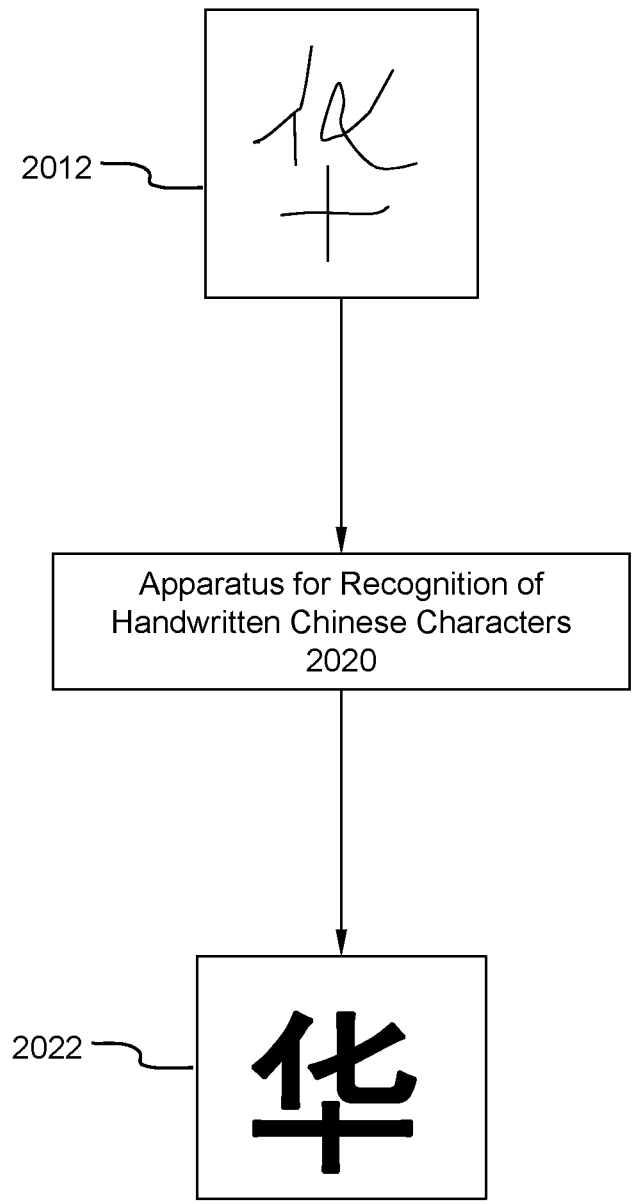
FIG. 20 is an overall diagram showing an example apparatus for recognition of handwritten Chinese characters in accordance with one embodiment of the invention.

FIG. 20 is a diagram showing an example apparatus 2020 for recognition of handwritten Chinese characters. A handwritten Chinese character "Hua" 2012 is the input. Imagery data of the handwritten Chinese character "Hua" 2012 is processed by a machine learning apparatus for recognition of handwritten Chinese characters 2020. The result is shown as a recognized character 2022 displayed in a desired font (e.g., SimHei font) on a display unit. The apparatus 2020 is configured for recognizing isolated Chinese character. In other words, the handwritten Chinese character has no constraint (e.g., order of the strokes, styles, etc.).

Figure 21:
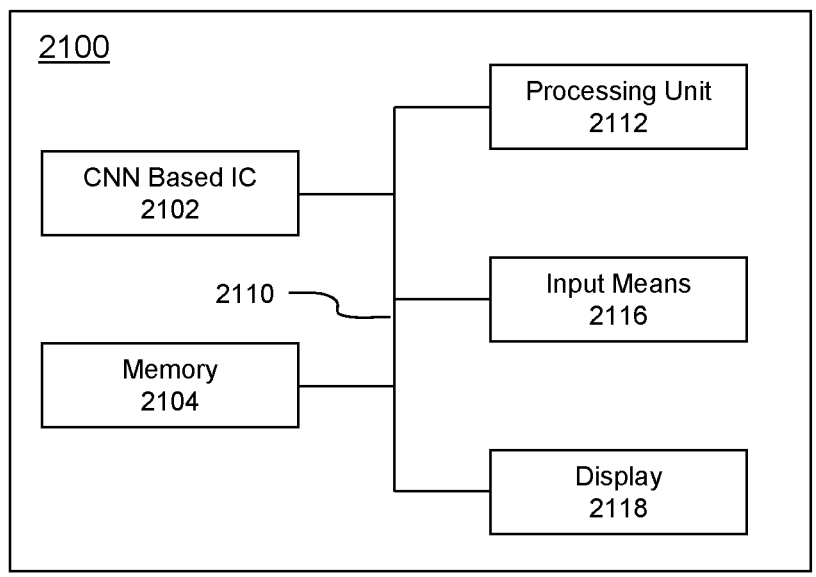
FIG. 21 is a function diagram showing a first example apparatus for recognition of handwritten Chinese characters in accordance with one embodiment of the invention.

A first example apparatus for recognition of handwritten Chinese characters 2100 is shown in FIG. 21. The first example apparatus 2100 contains at least a CNN based integrated circuit 2102 (e.g., CNN based integrated circuit 400 in FIG. 4A), a memory 2104 (e.g., Dynamic Random Access Memory or other suitable alternative storage), a processing unit 2112 (e.g., computer central processing unit, computer graphics processing unit, etc.), an input means 2116 (e.g., camera, scanner, touch screen, tablet pen, etc.) and a display unit 2118 (e.g., display screen). All of which are operatively connected to a bus 2110.

The first example apparatus 2100 is an embedded system using CNN based integrated circuit 2102 for computations of convolutional layers using pre-trained filter coefficients stored therein. The memory 2104 is configured for at least storing weight coefficients of fully-connected (FC) layers. The processing unit 2112 acts like a controller for carrying out a machine learning model (e.g., convolutional layers, FC layers, pooling operations, activation operations, etc.). The processing unit 2112 also controls input means 2116 to obtain an input imagery data from a handwritten Chinese character. The input imagery data may require certain conversion to a suitable format that can be processed by the CNN based integrated circuit 2102 (e.g., a 224-pixel×224-pixel). The display device 2118 displays the particular character as a result of image classification based on the machine learning model. In other words, the CNN based integrated circuit 2102 is used for extracting features out of the imagery data. The processing unit 2112 performs computations of FC layers to transform the extracted features to a particular character in a predefined set of Chinese characters. Each distinct Chinese character in the predefined set of Chinese characters is a unique class used in image classification.

Pre-trained filter coefficients contain multiple bi-valued 3×3 filter kernels. Each of the bi-valued 3×3 filter kernels contains fixed point number with positive or negative of a same numerical value. An example of bi-valued 3×3 filter kernel is shown in FIG. 19. The filter coefficients for convolutional layers and weight coefficients for FC layers are trained using a labeled Chinese character database with the predefined set of Chinese characters. For example, a Chinese handwriting database from Institute of Automation of Chinese Academy of Sciences (CASIA-HWDB). Training can be performed using process 1700 in FIG. 17. Training can also be performed directly using bi-valued 3×3 filter kernels without any transformation from floating point number format to fixed point number format.

Figure 22:
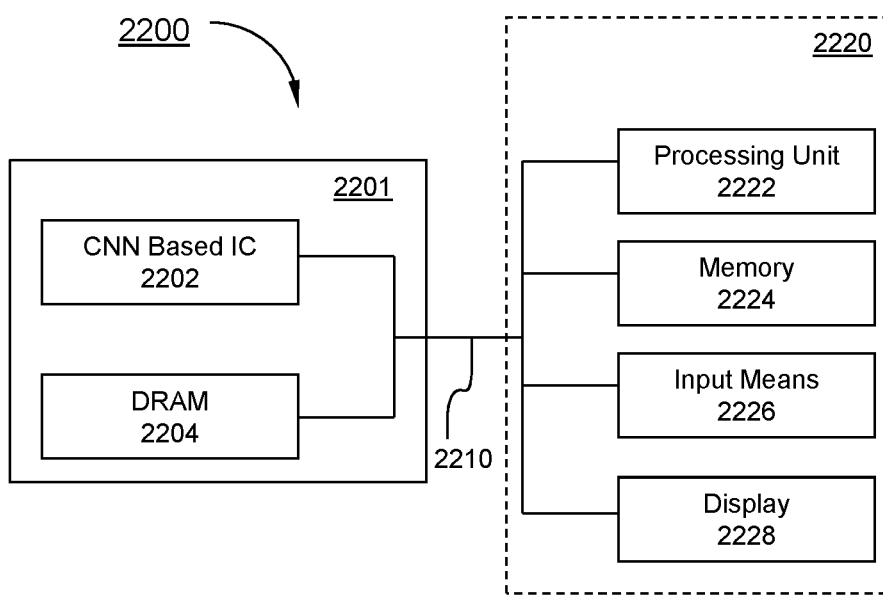
FIG. 22 is a function diagram showing a second example apparatus for recognition of handwritten Chinese characters in accordance with one embodiment of the invention.

FIG. 22 shows a second example apparatus for recognition of Chinese characters 2200. The second example apparatus 2200 contains a dongle 2201 and a host 2200 (e.g., a mobile phone) connected through a bus 2210 (e.g., USB).

Dongle 2201 contains a CNN based integrated circuit 2202 for storing filter coefficients of convolutional layers and a DRAM (Dynamic Random Access Memory) 2204 for storing weight coefficients of FC layers. Host 2220 contains a processing unit 2222, memory 2224, input means 2226 and display screen 2228. In one embodiment, when the host 2220 is a mobile phone, the input means 2226 can be through the display screen 2228 as touch screen input. Computations of FC layers are achieved with processing unit 2222 of the host 2220, while the computations of convolutional layers are achieved with the CNN based integrated circuit 2202.

Unexpected good accuracy of 95.25% is achieved with the deep learning model using bi-valued 3×3 filter coefficients based on unconstrained offline Chinese handwriting database level 1 set of GB2312-80 with 3755. Chinese characters. This result is better than other supposedly more accurate models, which use full floating point number format for filter coefficients. For example, the reported accuracy is 94.77% in the 2013. International Conference on Document Analysis and Recognition (ICDAR) competition on this database.

Although the invention has been described with reference to specific embodiments thereof, these embodiments are merely illustrative, and not restrictive of, the invention. Various modifications or changes to the specifically disclosed example embodiments will be suggested to persons skilled in the art. For example, whereas the two-dimensional symbol has been described and shown with a specific example of a matrix of 224×224 pixels, other sizes may be used for achieving substantially similar objections of the invention. Finally, whereas one type of bi-valued 3×3 filter kernel has been shown and described, other types may be used for accomplishing substantially similar objective of the invention. In summary, the scope of the invention should not be restricted to the specific example embodiments disclosed herein, and all modifications that are readily suggested to those of ordinary skill in the art should be included within the spirit and purview of this application and scope of the appended claims.

What is claimed is:

1. An apparatus for recognition of handwritten Chinese characters comprising:
   a bus;
   an input means connecting to the bus for receiving an input imagery data created from a handwritten Chinese character;
   a Cellular Neural Networks or Cellular Nonlinear Networks (CNN) based integrated circuit operatively connecting to the bus for extracting features out of the input imagery data using pre-trained filter coefficients of a plurality of ordered convolutional layers stored therein, wherein the CNN based integrated circuit comprises a plurality of CNN processing engines operatively coupled to at least one input/output data bus, the plurality of CNN processing engines being connected in a loop with a clock-skew circuit, each CNN processing engine comprising:
   a CNN processing block configured for simultaneously performing convolutional operations using the input imagery data and the pre-trained filter coefficients of a plurality of ordered convolutional layers;

a first set of memory buffers operatively coupling to the CNN processing block for storing the input imagery data; and a second set of memory buffers operatively coupling to the CNN processing block for storing the pre-trained filter coefficients;

a memory connecting the bus, the memory being configured for storing weight coefficients of fully-connected (FC) layers;

a processing unit connecting to the bus for performing computations of the FC layers to classify the extracted features from the CNN based integrated circuit to a particular Chinese character in a predefined set of Chinese characters; and a display unit connecting to the bus for displaying the particular Chinese character.

2. The apparatus of claim 1, wherein the bus comprises Universal Serial Bus.

3. The apparatus of claim 1, wherein the input means comprises a camera.

4. The apparatus of claim 1, wherein the input means comprises a scanner.

5. The apparatus of claim 1, wherein the input means comprises a touch pad for a computing device.

6. The apparatus of claim 1, wherein the input means comprises a pen tool for a tablet or a mobile phone.

7. The apparatus of claim 1, wherein the pre-trained filter coefficients comprises multiple bi-valued 3×3 filter kernels.

8. The apparatus of claim 7, wherein each of the bi-valued 3×3 filter kernels contains fixed point number with positive or negative of a same numerical value.

9. The apparatus of claim 1, wherein the pre-trained filter coefficients are trained using a labeled Chinese character database with the predefined set of Chinese characters.

10. The apparatus of claim 1, wherein the memory comprises Dynamic Random Access Memory.

11. The apparatus of claim 1, wherein the processing unit comprises a computer central processing unit.

12. The apparatus of claim 1, wherein the processing unit comprises a computer graphics processing unit.

13. The apparatus of claim 1, wherein the CNN based integrated circuit further performs pooling operations.

14. The apparatus of claim 1, wherein the CNN based integrated circuit further performs activation operations.

15. The apparatus of claim 1, wherein the display unit comprises a screen.

16. The apparatus of claim 1, wherein the particular Chinese character corresponds to a character defined in Unicode.

* * * * *